United States Patent [19]

Rossi

[11] Patent Number: 5,570,389

[45] Date of Patent: Oct. 29, 1996

[54] METHOD FOR RELIABLE EXCHANGE OF MODEM HANDSHAKING INFORMATION OVER A CELLULAR RADIO CARRIER

[75] Inventor: Markku J. Rossi, Houston, Tex.

[73] Assignee: Compaq Computer Corporation, Houston, Tex.

[21] Appl. No.: 268,291

[22] Filed: Jun. 30, 1994

[51] Int. Cl.$^6$ .................................. H04B 1/38; H04L 5/16
[52] U.S. Cl. .......................... 375/220; 375/223; 375/358; 375/377; 455/54.2
[58] Field of Search .................................... 375/222, 223, 375/377, 220, 356, 358; 370/91, 110.1; 455/33.1, 54.1, 54.2, 68, 89

[56] References Cited

U.S. PATENT DOCUMENTS

| | | | |
|---|---|---|---|
| 4,468,813 | 8/1984 | Burke et al. | 455/54.1 |
| 4,737,977 | 4/1988 | Norman | 455/54.1 |
| 5,070,536 | 12/1991 | Mahany et al. | 455/67.4 |
| 5,408,419 | 4/1995 | Wong | 455/89 |

*Primary Examiner*—Stephen Chin
*Assistant Examiner*—Don Vo
*Attorney, Agent, or Firm*—Pravel, Hewitt, Kimball & Krieger

[57] ABSTRACT

A technique for reliable passage of handshaking information between a cellular modem and a land modem. Instead of bare transmission over a voice channel connection highly susceptible to signal fading and dropout, the initial modem handshaking exchange is instead FSK-encoded and broadcast using a network data signalling methodology already used to reliably pass signalling information between the base and registered mobiles. Automatic retransmission request signalling and transmission redundancy may be implemented to insure successful receipt at the receiving end of the radio link. Once received and verified, handshaking information is decoded and delivered to the destination modem in the appropriate format along cleaner fixed pathways. Reliable handshaking operations are contemplated whether the destination modem is a cellular modem registered in auto-answer mode (land-originated data call), or a land modem (mobile-originated data call). Backwards compatibility with non-compatible cellular fixed-ends or mobiles is maintained through extensive use of active acknowledgment messaging and software timed transactions.

11 Claims, 22 Drawing Sheets

METHOD FOR RELIABLE EXCHANGE OF MODEM HANDSHAKING INFORMATION OVER A CELLULAR RADIO CARRIER

BACKGROUND OF THE INVENTION

1. Field of the Invention

This invention relates to data transmission in a wireless environment, and is specifically directed to a method for reliably passing modem handshaking information over a cellular radio link.

2. Summary of the Prior Art

With the introduction of cellular modem technology in the mid-1980's, personal computing has reached a new level of mobility. No longer is the traveling business limited to PSTN (public switched telephone network) outlets or specialized private mobile links in order to access data remotely. Instead, the cellular modems permit wireless data exchange between field personnel and a home office over conventional cellular radio networks which increasingly span the globe.

Data on cellular is especially attractive because of the immense international cellular coverage area, the high penetration of mobile cellular handsets into the marketplace, the relatively modest RF power amplifier requirements making it well-suited for a mobile environment, and the capability to relay both voice and modulated data reasonably well in full duplex mode. Also, startup and subscription costs are much lower than current wireless alternatives which require specialized data-only mobile transceivers having limited geographical access.

In operation, the cellular modem, which is typically coupled between the laptop or mobile computer and the mobile handset, communicates with a land based PSTN modem or another cellular modem through traffic channels granted to the mobile handset for the duration of the call. Ideally, the mobile station should appear as just another PSTN modem to the remote land modem. However, unlike conventional fixed network telecommunications, cellular radio is an inherently "dirty" data carrier, with perceived Bit Error Rates (BERs) approaching 2% (i.e., one error per 50 bits) at conservative 2400 baud transmission rates (by contrast, PSTN modems are unlikely to experience BERs exceeding $1 \times 10^{-5}$ at this speed). This is because, as a low power line-of-sight radio technology, cellular signals are susceptible to fading, shadowing and even dropout because of changing environmental conditions which momentarily block the transmission pathways. Noise and multipath interference also can severely degrade the signal. These events can result in signal loss anywhere from one millisecond to greater than five seconds, at which point the cellular system clears the call. Signal disruptions for several hundred of milliseconds can also occur due to the signalling strategy of cellular radio, such as power stepping the mobile handset as approaches or moves away from a cell site and handoff when moving from one cell boundary to another.

Though transmission impairment experienced during any point of a data call can be catastrophic, errors encountered during the initial handshaking phase have the most significant impact, for it is at this point where signalling protocol error correction and data compression standards are established for the call duration. This is compounded by the fact that much of the initial modem handshaking runs "bare", (i.e., no error correction or compression is performed to insure compatibility with older land modems lacking such features). Plus, standard cellular-specific error protection techniques such as ARQ (automatic retransmission request for erroneous data) and FEC (forward error correction) introduce significant lapses in the data stream which could, at this initial stage, be misinterpreted as a carrier loss event. For example, cellular signal fade experienced in the initial connect tone exchange may cause a land modem to mischaracterize the cellular modem's handshaking statistics, resulting in a 1200 baud connection with no error correction or compression even though both modems may possess full V.42bis and MNP5/LAPM capabilities. A less than optimal data bottleneck is thus needlessly formed, if indeed a connection is established at all.

Prior art systems have addressed this problem by the addition of specialized hardware into the cellular network or through the use of specially adapted modems at the mobile stations and fixed-ends. For example, both the proprietary AT&T/Paradyne and the MNP10 protocols provide for reliable handshaking services. However, both the cellular modem and the fixed-end modem must recognize and support these protocols; otherwise, the handshaking sequence is left unprotected. Other systems, such as Vodaphone Ltd.'s VMACS (Vodaphone Mobile Access Conversion Service) cellular data gateway used in Great Britain's analog Total Access Communications (TACS) cellular system eliminates the need for over-the-air modem coordination and handshaking since all cellular data transmissions follow a predefined transfer rate and error protection (i.e. through well-known cyclic CLDC algorithms). Handshaking with the PSTN modem is performed exclusively by pool modems on the fixed-end side of the VMACS gateway. However, the VMACS system is disadvantageous because it requires additional system hardware (specialized CLDC modems at the mobile end base stations) and system signalling services not provided in the typical AMPS analog cellular system while limiting the mobile subscriber to only one type of cellular modem. Plus, the meager predefined data rates only permit forward transmission at 2400 baud and reverse transmission at 150 baud. With VMACS, therefore, mass data transmission simultaneously in both directions is not possible and hardware options are limited.

It is therefore desirable that a more flexible solution be found to optimize potential data throughput and reliability in a cellular environment. A variety of cellular modems and transmission protocols ranging from basic Bell 103 to V.42bis and beyond should be supported. To reduce cost and ease the equipment upgrade process, the desired solution should rely on additional firmware rather than hardware modifications whenever possible. It would also be desirable that the reliable handshaking functions be carried out in a manner transparent to the land modem yet remain compatible with non-upgraded cellular equipment. Finally, the desired techniques should be generally adaptable to a wide variety of analog cellular systems in current and projected use, including AMPS (Advanced Mobile Phone Service), TACS, JTAC (Japanese TACs), NAMPS (Narrowband AMPS) and NMT (Nordic Mobile Telephone).

SUMMARY OF THE INVENTION

The present invention includes updated firmware in both the cellular modem and the mobile handset it controls. At the fixed-end of the cellular network, which includes the base station(s) and the mobile switching center (MSC), PSTN modems are selectively interposed between the MSC and the PSTN to carry out the handshaking operations, synchronize carrier signals and establish the data connection to the land modem at the other end. Signalling extensions to the mobile/ base protocol will be necessary to reliably transport handshaking information so updated firmware in the cellular fixed-end will be added. Of significance is the fact that existing signalling methodologies inherent to analog cellular will be adapted to be used to reliably transport handshaking information over the air.

According to the present invention, a mobile subscriber initiates a "data" call via communications software running on a laptop or mobile computer coupled to the cellular modem. A cellular modem informs the mobile handset coupled to it that the call will be a "data" call, and the handset will broadcast a data originate message to the cellular network.

When the data compatible cellular network responds to the originate message, traffic channels are allocated and connections to the PSTN are routed in a conventional manner as though it were handling a voice call. But, unlike a conventional voice call, the cellular network switches a first PSTN modem into the junction between it and the ultimate destination modem, be it located within the PSTN, a private network or even another cellular system. When relaying traffic channel tuning information back to the mobile handset/cellular modem tandem, the cellular network indicates that it is prepared to receive the handshaking information specified for the cellular modem. The mobile handset broadcasts handshaking information for the cellular modem to the cellular network encoded in a reliable data format. Preferably, this reliable format is the same used to handle conventional control data (signalling) traffic between mobiles and the network. The handshaking information will contain all parameters necessary to remotely initiate an ITU CCITT V.22 or Bell 212A modem connection including transfer mode, speed, error correction and data compression well known to those skilled in the art.

Once received, the cellular network decodes the handshaking information and translates it in a well known manner to appropriate UN/ITU modem initialization commands. The commands are then downloaded to the first PSTN modem so it can dial and establish an optimal connection with the destination modem.

When the modem connection is made, the first PSTN modem instructs the destination modem to "wait" for the cellular modem to be switched in using active pause commands. Meanwhile, a second PSTN modem listens in on the handshaking negotiation to synchronize itself with the land modem and first PSTN modem. Concurrently, the cellular network relays the connection result codes to the mobile station which originated the data call, again using a reliable transfer means.

Upon receipt of the connection result codes, the mobile handset decodes the connection information and downloads it to the cellular modem. Then, it broadcasts an acknowledge signal to the cellular network and releases the traffic channels to the cellular modem. The acknowledge signal prompts the cellular network to switch in the second assigned PSTN modem so the cellular modem can be properly synchronized when the traffic channels are released. When carrier signal synchronization and data speeds are confirmed, both PSTN modems are switched out and normal data operations commence.

Land originated "data" calls will be handled similarly to their conventional voice counterparts, except that: 1) reliable handshaking operations are carried out and the originating land modem is paused before the mobile is paged for the call; 2) an extended page format is used to deliver connection result information to the mobile; 3) the cellular modem synchronizes to the land modem after handshaking is passed; and (4) the mobile station must inform the network when the cellular modem enters and exits auto-answer mode. Preferably, the mobile station preregisters its handshaking information with the network to decrease latencies during the crucial modem connection phase. Also, reregistration information will be periodically resent to refresh PSTN modem assignments and mobile location.

Therefore, the present invention presents an adaptable, primarily firmware solution to reliably transport modem handshaking information over the air without specialized PSTN modem protocols or inflexible cellular data transmission standards. The only additional hardware required would be the standard UN/ITU PSTN modems controlled by the cellular fixed-end having switchable links into and out of the PSTN interface with the land modem. A digital bus interface will preferably electrically connect the cellular modem and the attached mobile handset to permit unmodulated transfer of control signals and handshaking information. However, the cellular modem may otherwise conform to any UN/ITU recognized protocol. Thus, the reliable handshaking technique of the present invention offers a cost-efficient and flexible way to reliably establish a modem connection which in turn maximizes potential data throughput through cellular radio link.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
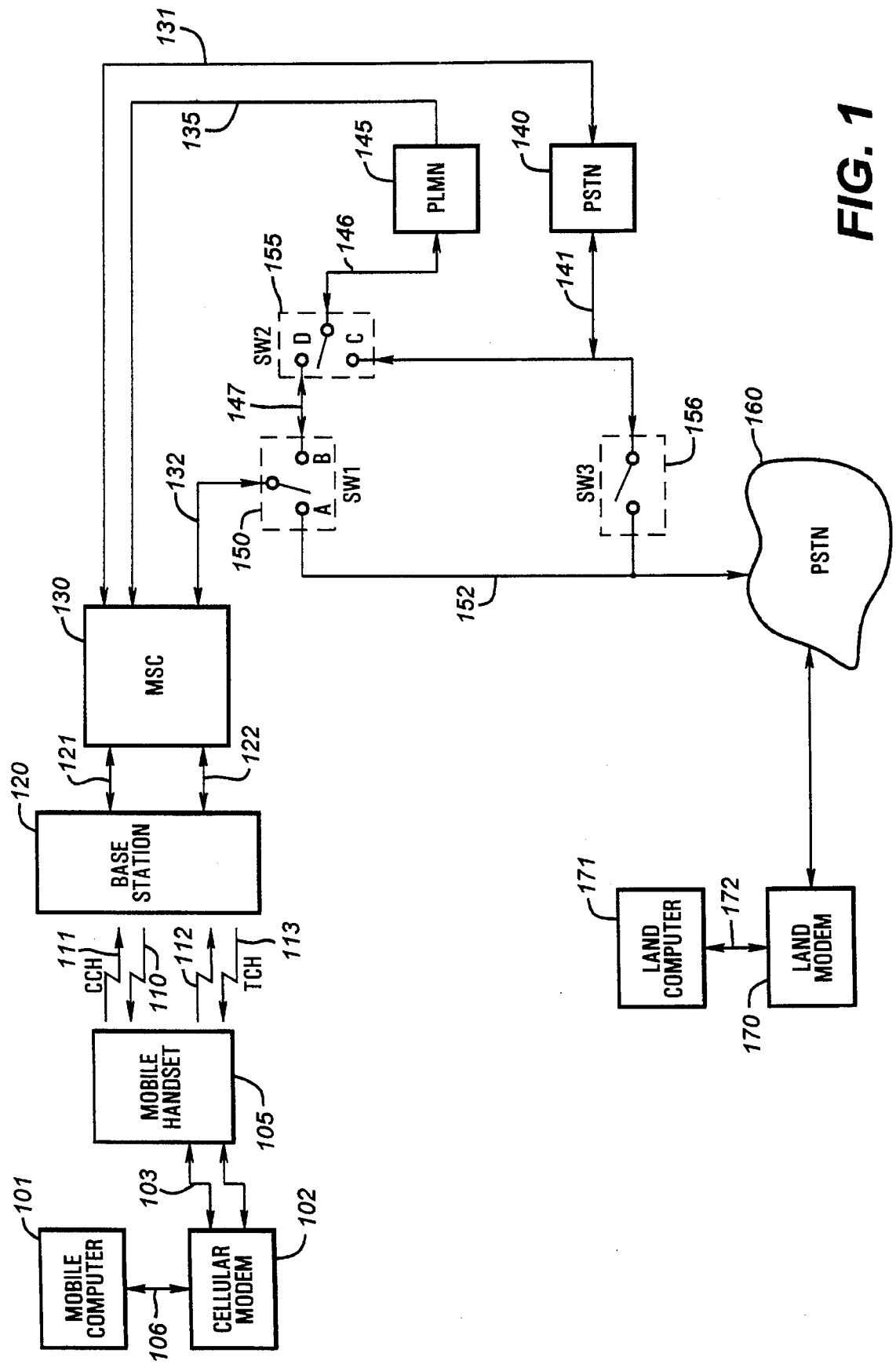
FIG. 1 is a block diagram of a cellular network in which the preferred embodiment may be practiced.

Referring now to the drawings, FIG. 1 is a system block diagram of a representative cellular/land network in which the present invention may be practiced. In the preferred embodiment, the cellular network is an adaptation of the Advanced Mobile Phone System (AMPS) architecture used in North and Latin America, but it will readily become apparent to one of ordinary skill in the cellular art that the invention can be easily adapted to work with other analog cellular architectures, including Narrowband AMPS (NAMPS), Narrowband Total Access Communications (NTACS) or JTACS, Nordic Mobile Telephone (NMT) and standard TACS.

In FIG. 1, mobile personal computer 101 is shown connected to cellular modem 102 via interface 106 (e.g. serial interface RS232, RS232C, RS422 or similar). Mobile personal computer 101 and the subscriber/user (not shown) preferably communicates with cellular modem 102 using a conventional terminal emulation and/or telecommunications software package capable of driving cellular modem 102. Cellular modem 102 is also electrically connected to cellular mobile handset 105 via cellular direct connection 103 and analog voice lines 104. Cellular direct connection 103 is used to pass telephone numbers, modem handshaking and other control-related information in digital format between the cellular modem 102 microprocessor and mobile handset 105 microcontroller. Analog voice lines 104 (tx/rcv) carry modulated data between the cellular modem 102 and the mobile handset 105 during a call, as is well-known in the art. Preferably, cellular modem 102 is a Compaq SpeedPaq or compatible cellular modem tightly coupled via a cellular direct connection to a MicroTac series cellular mobile handset manufactured by Motorola, Inc. or a cellular mobile handset manufactured by Nokia, Inc., as described in U.S. Pat. No. 5,408,521 and U.S. patent application Ser. No. 07/973,625, filed Nov. 9, 1992, both assigned to Compaq Computer Corporation, which are incorporated herein by reference.

As shown in FIG. 1, up to four radio links are maintained between mobile handset 105 and base station 120 of the cellular fixed-end. These include forward control channel 110 and reverse control channel 111 which are maintained continuously in the cellular network of the preferred embodiment, as well as forward traffic channel 113 and reverse traffic channel 112 which are allocated to the base station 120 and mobile handset 105 to carry analog voice and modulated data during a call. In the preferred embodiment, the conventional AMPS protocol is used to define channel allocation, channel signalling, handoff procedures and other cellular services unless otherwise described below. Unique signalling and handshaking information used to establish a reliable data communications link according to the preferred embodiment will be passed between the cellular fixed-end and the mobile station using channels 110–113.

For purposes of simplicity, only one base station 120 is shown though typical cellular systems have several tens to hundreds of base stations distributed across a geographic area. However, the particular number of type base stations is not relevant to the technique of the preferred embodiment, other than the base be in communication with a Mobile Switching Center (MSC) 130 capable of interpreting the handshaking and signalling information defined below.

When FSK modulated data is broadcast by the mobile handset 105, the receiving base station 120 converts it into its digital word equivalent and routes it to MSC 130 via bidirectional control links 122. Likewise, signalling tones received at the base are converted into digital data and passed along control links 122 to the MSC 130. Actual audio, including modem modulated data and voice, is separated from control information at the base station 120 and sent to MSC 130 via audio links 121.

Similarly, data sent to mobile handset 105 from MSC 130 is encoded into FSK format and broadcast on either forward control channel 110 or forward traffic channel 113 depending on call status and mode of the mobile. Audio, including voice and modulated data, is combined with any signalling tone information and broadcast to the mobile handset 105 over forward traffic channel 113.

As is well known in the cellular networking art, the second major component of the cellular fixed-end and "brain" of the network, the MSC 130 interfaces between the base stations 120 and the land telecommunications network. Though not shown, it can also be linked by an IS-41 data line to other MSCs in a multi-switch environment. In this embodiment, the land telecommunications network is the Public Switched Telephone Network (PSTN) 160, though the MSC 130 may alternatively interface to a private line network so long as the land modem 170 serving as a communications end point can interpret CCITT V.22 or equivalent modem handshaking protocols.

In FIG. 1, the MSC 130 has two pathways to channel information to PSTN 160. The first, bidirectional voice line 132, handles standard audio traffic including modulated data. The second way involves serial communications line 131 connected to one of a pool of several UN/ITU modems shown here collectively as PSTN pool modem 140. Pool modem 140 interfaces with the PSTN-MSC interface 152 of PSTN 160 via modulated data line 141 and can exchange modulated data with land modem 170 when switched in by the MSC 130.

Another serial communications line 135 links the MSC 130 to another UN/ITU modem from a second pool of reserved modems shown collectively as Public Land Mobile Network (PLMN) modem 145. The PLMN modem 145 responsibilities include synchronizing the cellular modem 102 to the land modem 170—pool modem 140 connection once the traffic channels are released, through preferably renegotiation of the carrier phase and baud rate.

A series of high speed switches, SW1 150, SW2 155 and SW3 156, are manipulated by MSC 130 (control lines not shown) to properly route modulated data to the PSTN 160, pool modem 140 or PLMN modem 145. SW1 150 directs the passage of modulated data between the MSC 130, the PSTN 160 and audio link 147 switchably connected to the audio input/output of PLMN modem 145. SW2 155 enables the PLMN modem 145 to selectively communicate modulated data with either land modem 170 in parallel with pool modem 140 or with cellular modem 102 through the above-described cellular radio links. SW3 156 is used to selectively permit modulated data to pass between land modem 170 and pool modem 140 through modulated data line 141 and the PSTN 160.

The actual switch configurations used to implement the preferred embodiment will be discussed in greater detail below in conjunction with the MSC's 130 responsibilities.

In FIG. 1, only a single set of connections (132, 141) to a PSTN-MSC interface 152 of PSTN 160 is indicated, however, it will become readily apparent to those ordinarily skilled in the art that the MSC 130 can maintain several connection sets and a plurality of pool and PLMN modems yet still provide reliable handshaking and optimal modem connections according to the preferred embodiment. Likewise, the specific number of voice line interfaces 152 connecting PSTN 160 to MSC switches SW1 150, SW2 155 or SW3 156 are not relevant to practicing the techniques according to the presently preferred embodiment.

In addition, FIG. 1 shows land modem 170 connected to PSTN 160 which, through the above described network, can contact and exchange information with cellular modem 102. PSTN land modem 170 is not limited to any specific modem type speed or protocol standard as long as it can recognize conventional Bell 212A or CCITT V.22 signaling standards at a minimum. Nor is land modem 170 limited to being a land modem: it may very well be another cellular modem emulating a standard UN/ITU modem. In this embodiment, however, land modem 170 is preferably a Hayes-compatible UN/ITU modem having a conventional modem interface 172 to land computer 171. Thus, with the above-described network, a communications line for or transferring modulated data can be established in an optimized manner and maintained between land computer 171 and mobile personal computer 101.

Figure 2A:
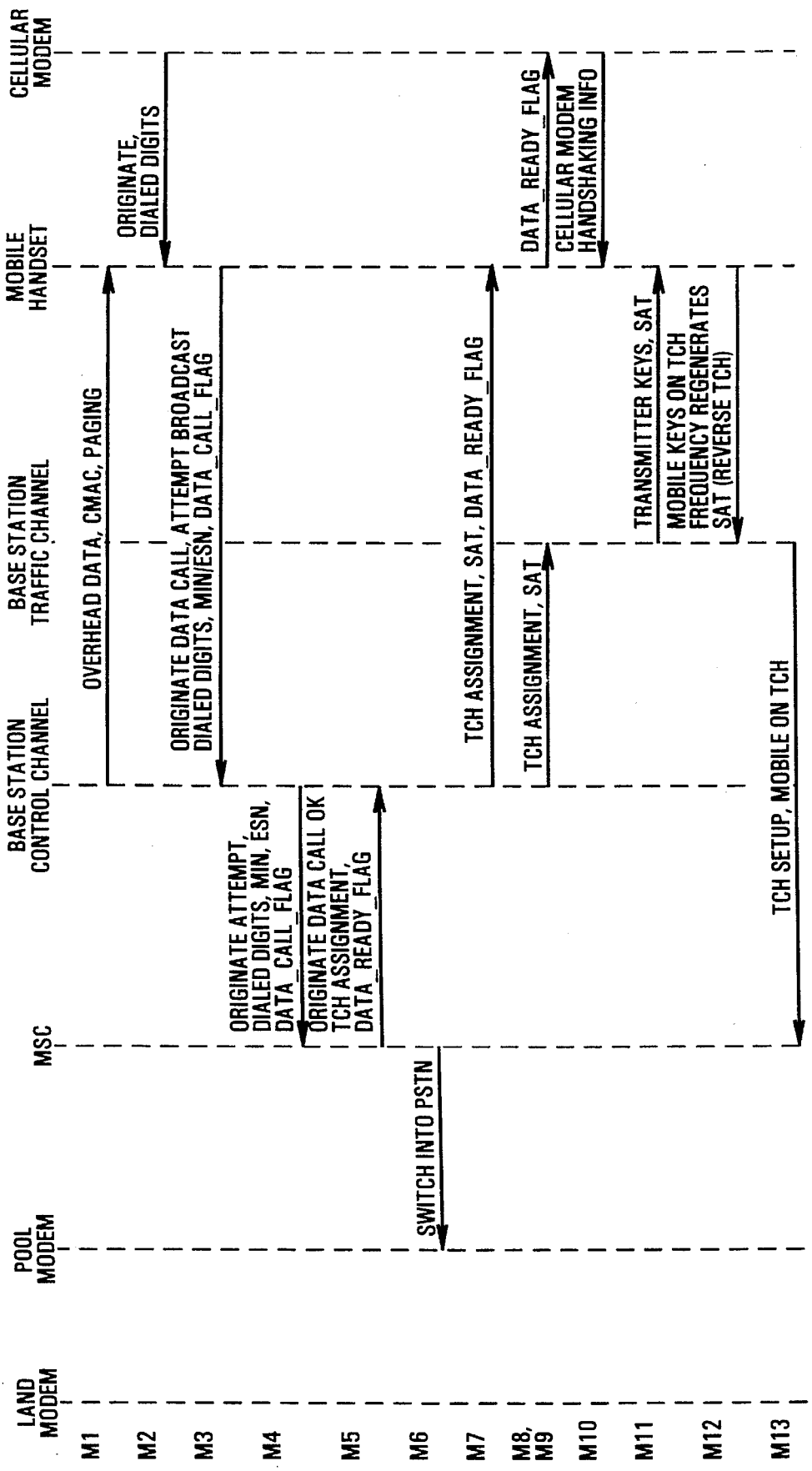
FIG. 2A–B is a signalling event chart of the data and signalling protocol needed to establish a mobile-originated data call according to the preferred embodiment.
Figure 2B:
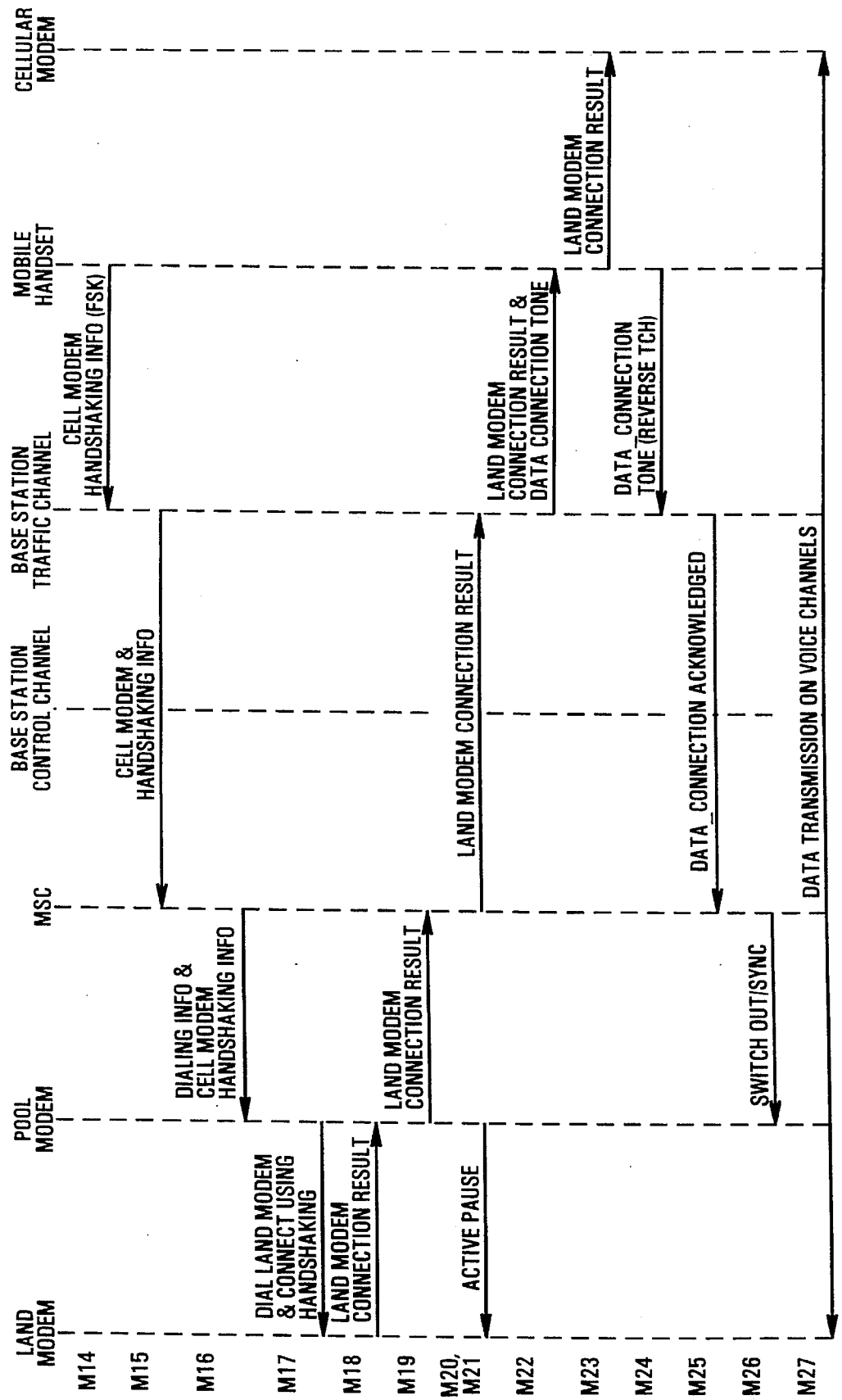

FIG. 2A–B illustrates the signalling and data communications required to establish a mobile originated data call according to the preferred embodiment over the cellular network illustrated in FIG. 1. Unless otherwise noted, the signalling shown in this Figure and in FIGS. 3, 4A, 4B and 5 progresses sequentially from the smallest event number to the largest event number within the figure. When two or more events occur simultaneously, they are placed on the same line, separated by commas.

According to the preferred embodiment, mobile origination of a call begins at initial state M1. At state M1, the network is idle as is well known in the art: the base station is transmitting reverse control channel state information and other overhead data along with CMAC and paging information for mobile handset 105 and other registered mobiles it is assigned to service. Mobile data call origination begins at event M2, when the cellular modem 102 sends an originate command containing the dialed telephone number of the destination land modem 170 across cellular direct connection 103 in a routine manner. Mobile handset 105 receives the originate command and dialed digits from cellular modem 102, and when the reverse control 112 channel for the base station 120 is free, sends an Originate Data Call Attempt Broadcast across this channel to base station 120 at event M3. The Originate Data Call Attempt Broadcast will include the telephone number of the destination land modem 170, the mobile identification number (MIN) of the mobile handset, the mobile's electronic serial number (ESN), and a reserved flag called a $data_{13}$ call_flag to indicate that a data call is requested. Preferably, the Originate Data Call Attempt Broadcast will use the same data word format as that used for mobile origination of conventional voice calls in an AMPs compatible cellular network with the data_call_flag occupying a reserved bit as well known in the art.

In this embodiment, the Originate Data Call Attempt Broadcast, along with all other data communications between the mobile handset 105 and the base station 120, follow the conventional 10 kbps FSK data signalling protocol used in AMPS compatible systems. This reduces code proliferation and eases integration of the technique according to the preferred embodiment into existing AMP implementations, without significant hardware changes at the mobile station or fixed-ends. As performed with this and all over_the_air FSK data signalling, the base NRZ bit string of the data word is dual encoded for error detection and correction purposes. Initially, the NRZ bit stream is encoded into a conventional Manchester code that allows the base station 120 to track the phase and filter out DC bias during long strings of 1's or 0's. Secondly, a conventional cyclic BCH (Bose-Chaudhuri-Hocquenghem) code, either a (48, 36) code if the data pathway is along one of the control channels, or a (40, 20) code if the data is passed along a traffic channel, is applied to the resultant word for correction purposes. Finally, as is specified for conventional AMPS data signalling and all additional data signalling required by the preferred embodiment, the Originate Data Call Attempt Broadcast data word will be repeated eleven times over the length of the transmission (about 100 ms) to ensure successful receipt.

After the base station 120 receives the Originate Data Call Attempt Broadcast from the mobile handset 105 in event M3, the base station 120 decodes the FSK encoded information, performs routine error detection and correction activities and passes it to the MSC 130 in event M4. It should be noted here and at any other time during FSK modulated data transmission sequences according to the preferred embodiment that should uncorrectable errors be detected in the received data frames, the base station will broadcast a conventional Automatic Retransmission Request (ARQ) commanding the mobile to resend the broadcast. Similarly, the mobile handset 105 will also check for uncorrectable errors in data passed to it by the cellular fixed-end and use ARQ protocols to force resubmission of the erroneous frames.

Assuming that the MIN/ESN combination is valid and that pool and PLMN modems are available to handle the handshaking exchange and synchronizing operation, the MSC 130 sends an Originate Data Call OK Broadcast to the base station 120. The Originate Data Call OK Broadcast is similar to the conventional originate OK broadcast sent by the MSC 130 in response to a voice origination request, except that a data_ready_flag contained in a previously reserved bit of the data signalling word is set to indicate that the cellular-fixed-end can handle reliable handshaking according to the preferred embodiment. At event M6, the MSC 130 readies the PSTN modem 140 and the PLMN modem 145 for use.

At event M7, the base station 120 broadcasts the Originate Data Call OK Broadcast to the mobile handset 105 over the forward control channel 110 using FSK data signalling. Included in this broadcast are the traffic channel assignments, the SAT (supervisory audio tone) color information and the status of the data_ready_flag as previously discussed. At events M8 and M9, the base station 120 tunes to the forward and reverse traffic channels and the mobile handset 105 propagates the data_ready_flag to cellular modem 102. At event M10, handshaking information including data transfer rate, error correction and compression protocols used, etc., as is well known to those ordinarily skilled in modem communications, is sent from the cellular modem 102 to the mobile handset 105. At event M11, the base station 120 keys on the allocated forward traffic channel and generates the SAT tone as is well known in the art. At event M12, the mobile keys on the assigned reverse control channel and transponds the received SAT tone back to the base station 120. This causes the base station 120 to signal to the MSC 130 in a known manner that the transmit channels have been successfully allocated and that the mobile is keyed on the proper reverse traffic channel at M13.

At event M14, the mobile handset 105 FSK encodes previously received handshaking information from the cellular modem 102 and broadcasts it to the base station 120 using the reverse traffic channel. At event M15, the base station decodes the handshaking information, error checks it and routes it to the MSC 130. At event M16, the MSC downloads the handshaking information in appropriate modem command format along with the destination PSTN dialing information to the pool modem 140 previously allocated to handle handshaking for the data call. At event M17, switch SW1 150 is set to B position and SW2 155 is set to C position (see FIG. 1) to isolate audio line 132. Concurrently, SW3 156 is closed to form a bidirectional audio pathway (141) between the PSTN and pool modem 140. The pool modem 140 proceeds to dial land modem 170 and establishes a connection using the supplied handshaking information. At event M18, the land modem 170 responds with connection result codes well known in the art.

Note here that by virtue of SW2 155 now positioned at "C" the PLMN modem 145 will listen in to the handshake negotiation between pool modem 140 and land modem 170 traveling through modulated data line 141 and synchronize with these modems when the connection is established. The PLMN modem 145 will be used to synchronize the cellular modem 102 to the land modem 170 in the preferred embodiment when the traffic channels 112, 113 are released by the mobile handset 105 to the cellular modem 102.

At event M19, the pool modem 140 uploads the land modem 170 connection result codes to the MSC 130, which it then routes as a data word to the base station 120 servicing mobile handset 105 at event M20.

At event M21, the pool modem generates active pauses as is well understood in the art to keep the land modem "connected" until a full audio pathway can be established between the destination land modem 170 and the cellular modem 102.

At event M22, the land modem connection result codes are placed in a single 40 bit frame (used in AMPS data signalling) encoded in FSK format as previously discussed and broadcast over the forward traffic channel to the mobile handset 105. Simultaneously, the base station 120 broadcasts the data connection supervisor tone to indicate to the mobile that a connection has been established and the land modem is ready to receive information. Preferably, the data connection tone is a unique 12.5 kHz tone having a duration of at least 50 milliseconds. At event M23, the mobile handset 105 decodes the land modem connection result codes from FSK format, checks for transmission errors, and routes it to cellular modem 102. At event M24 the data connection tone is briefly transponded (approximately 50 ms) by the mobile handset back to the base station 120 on the reverse traffic channel. The regenerated data connection tone verifies that connection result codes have been reliably passed between the destination land modem 170 and the originating cellular modem 102. At event M25, the base station 120 informs the MSC 130 that the data connection signal has been received from the mobile handset, preferably in a signalling manner similar to that used for indicating that the mobile is keyed and waiting during a conventional voice call or an AMPS cellular system. At event M26, the MSC 130 toggles SW2 155 to position D and prepares PLMN 145 to synchronize carrier signals with cellular modem 102. It should be noted here that PLMN 145 is already carrier and phase synchronized with both pool modem 140 and land modem 170 and will retain such synchronization. At event M27, the traffic channels are released to cellular modem 102, and cellular modem attempts synchronization and speed negotiation with PLMN modem 145. Once synchronized, and if necessary, transmission speed reset for both the cellular modem 102 and land modem 170, the MSC 130 proceeds to switch out PLMN modem 145 and pool modem 140 from the voice channel so conventional modulated data exchange can begin. This is done by toggling SW1 150 to position A and opening switch SW3 156. A complete analog voice channel is thereby formed between land modem 170 and cellular modem 102. Thus, a mobile originated data call is initialized using the technique of the preferred embodiment and modulated data transmission between the modems can commence.

Termination of the mobile originated call is handled in a conventional manner, preferably using standard AMPS signalling protocols.

Figure 3:
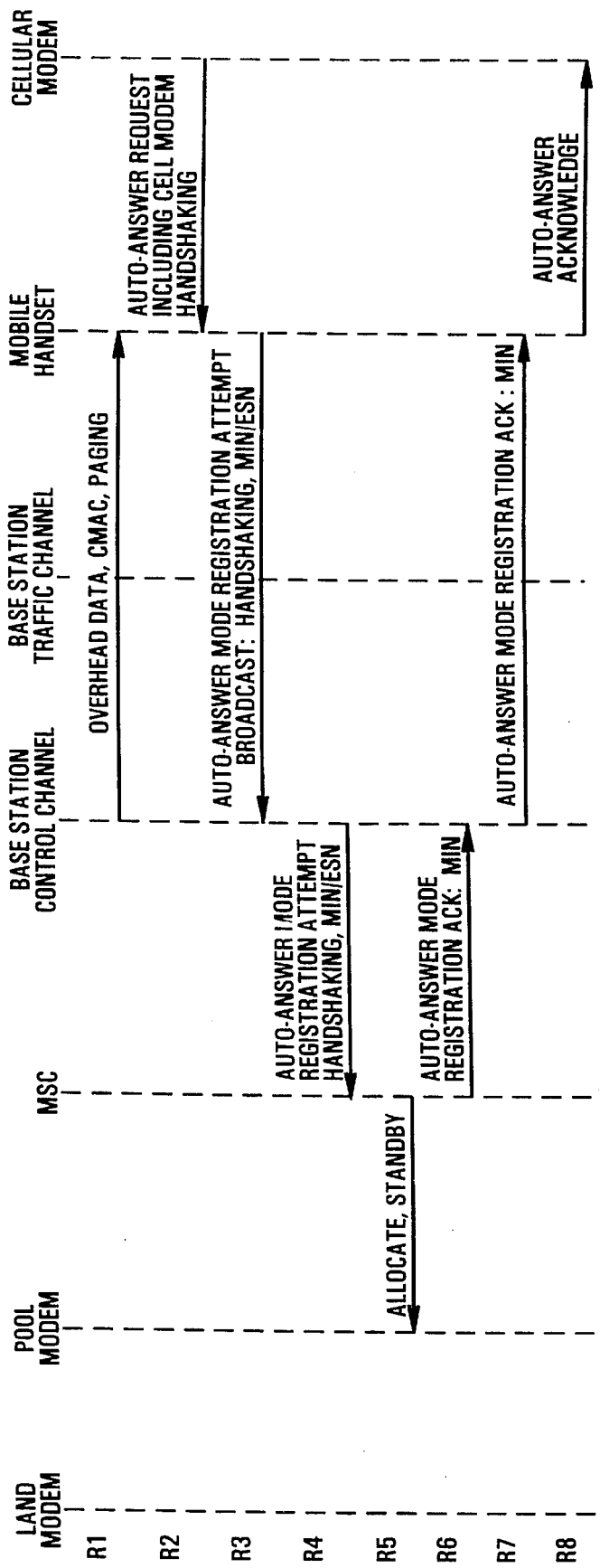
FIG. 3 is a signalling event chart of the data and signalling protocol needed to establish auto answer mode registration according to the preferred embodiment.

FIG. 3 illustrates the signalling and data communications required to place a mobile station in auto-answer mode according to the preferred embodiment. Auto-answer registration according to the preferred embodiment begins at event R1.

As discussed previously, the registration process informs the cellular fixed-end that a mobile station has been placed in auto-answer mode by the subscriber and is expecting an incoming data call. This notification allows the fixed-end to trap the call exchange handshaking and move the data connection without polling all the active mobiles. Preferably, the registration includes handshaking for the cellular modem 102, so page response time is minimized and reverse control channel traffic is reduced during the timing critical initial phase of the modem connection sequence.

At state R1, the network is idle with the base station 120 transmitting overhead CMAC and paging information in a conventional manner. Auto-answer registration begins at event R2, with the cellular modem 102 relaying an auto-answer request to mobile handset 105 via cellular direct connection 103. At event R3, the mobile handset 105 broadcasts an Auto Answer Mode Registration Attempt Broadcast including handshaking information for a cellular modem 102 and the handset MIN/ESN packed into a 40 bit data word and encoded in standard FSK format as previously described. The Auto Answer Mode Registration Attempt Broadcast will be sent over the reverse control channel 111 to base 120. At event R4, the base 120 decodes and verifies Auto-Answer Mode Registration Attempt Broadcast information to the MSC 130. At event R5, the MSC 130 will grab an available pool modem 140 and PLMN modem 145 and place them in answer standby mode as is well known in the art. Then, at event R6, the MSC 130 will send an Auto Answer Mode Registration Acknowledge broadcast containing the mobile identification number of the registering mobile acknowledging receipt of the handshaking information. At event R7, the base station 120 broadcasts the Auto-Answer Mode Registration Acknowledge tagged by the mobile identification number in conventional FSK format across the forward control channel. Preferably, the acknowledge will be formatted in a manner similar to that employed in conventional mobile handset paging operations in AMPs cellular networks. At event R8, the mobile handset 105, having received the Auto-Answer Mode Registration Acknowledge, relays this information to the cellular modem 102. Thus, with the above signalling sequence, the mobile station and the MSC 130 of the cellular fixed-end are aware of the auto-answer status.

Figure 4A:
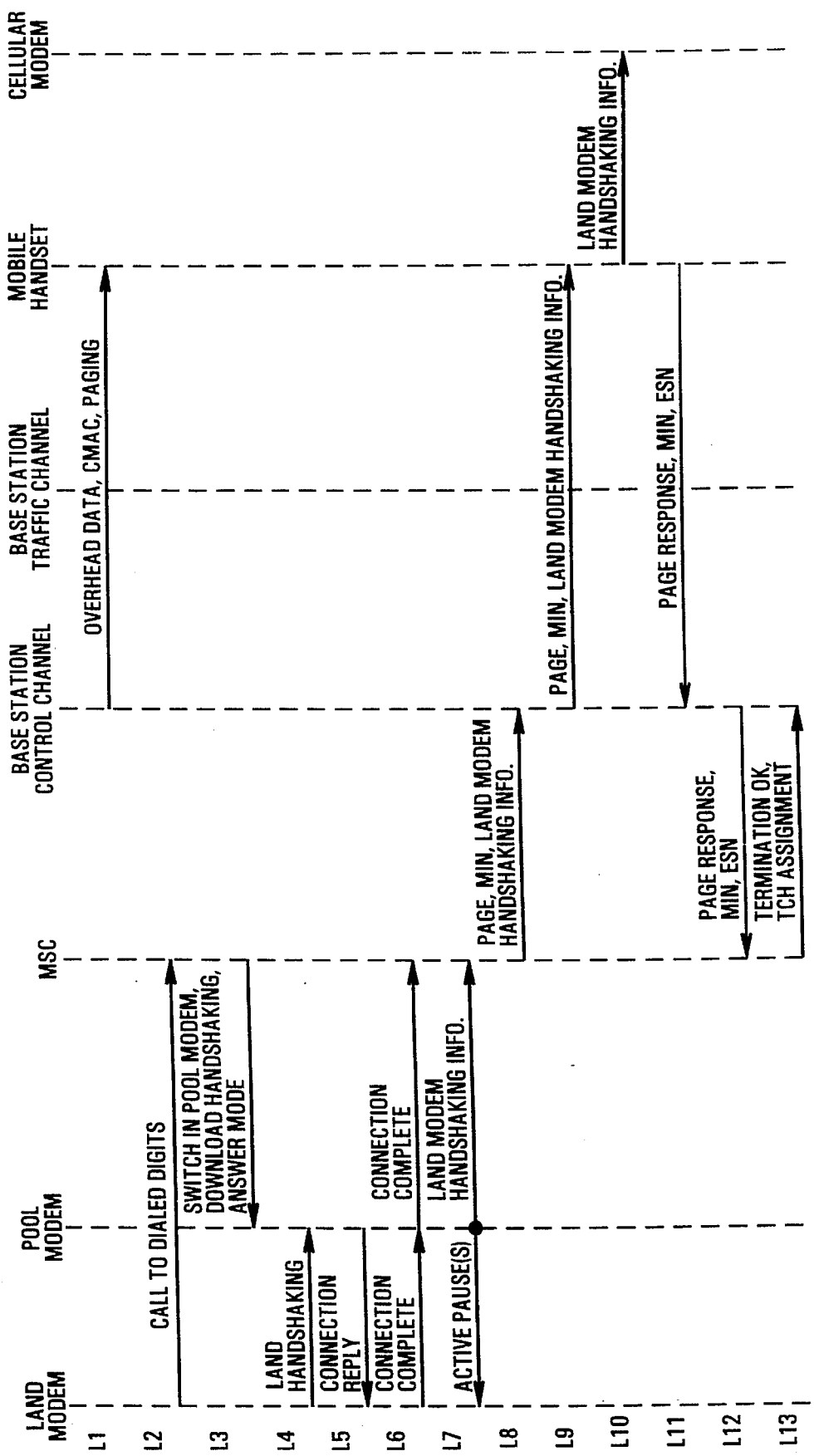
FIG. 4A–B is a signalling event chart of the data and signalling protocol needed to establish a land originated data call according to the preferred embodiment.
Figure 4B:
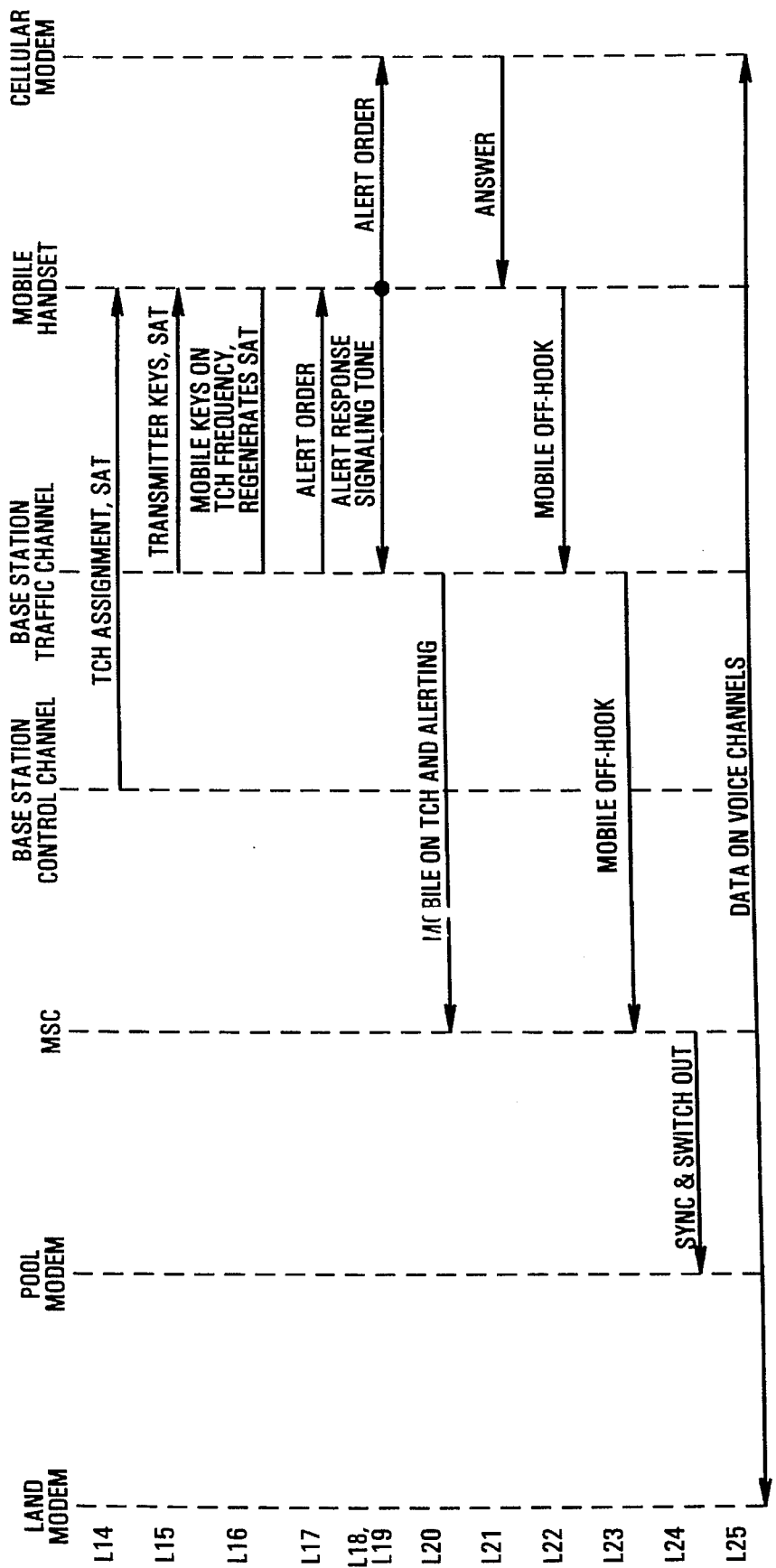

Referring now to FIGS. 4A and 4B, these Figures illustrate the signalling and data communications required to establish a land modem originated data call according to the preferred embodiment over the cellular network of FIG. 1. Assuming that the mobile station has previously auto-answer registered with the cellular fixed-end, land-originated data calls are handled in the following manner. At event L1, the cellular network is idle. At event L2, an incoming call from land modem 170 is detected by MSC 130. The MSC 130 determines that the dialed telephone number corresponds to a mobile station previously registered and in active auto-answer mode. At event L3, the pool modem 140 and PLMN modem 145 associated with the mobile identification number previously allocated and placed in standby answer mode are switched in. Specifically, SW1 150 is set to position A, SW2 155 is set to position D and SW3 156 is closed to enable communications between the originating land modem 170 and pool and PLMN modems assigned to the mobile. Simultaneously, previously stored cellular modem handshaking information is downloaded to the pool modem 140. At event L4, the land modem 170 attempts connection with the pool modem 140 by sending its handshaking information to the pool modem. At event L5, the pool modem responds with an appropriate handshaking reply. At event L6, the land modem 170 signals connection-complete to the pool modem 140 who then passes this on to the MSC 130. Throughout the connection sequence, PLMN modem 145 observes the negotiation process and synchronizes with the pool and land modems when the connection is made. At event L7, the pool modem actively pauses the land modem until a direct audio connection can be established between the land modem 170 and cellular modem 102. Simultaneously, land modem handshaking information is passed from the pool modem 140 to the MSC 130 over interface 131.

At event L8, the MSC formulates an extended page which includes a conventional page supplemented by land modem handshaking information. The land handshaking information data word will preferably comprise a conventional signalling 40-bit word, and will be preferably be formatted similar to that described for the cellular modem 102 handshaking information. At event L9, the extended page including land handshaking information data word is FSK encoded and broadcast by the base station 120 over the forward control channel 110 to mobile handset 105. The extended page will preferably be formatted as a conventional page with an additional 40-bit frame devoted to land modem handshaking information placed at the end. The mobile handset 105 receives the extended page, decodes and verifies it, and strips the land handshaking information from it. At event L10 the mobile handset 105 sends the decoded land handshaking information to cellular modem 102. At event L11, the mobile handset broadcasts a conventional page response to base station 120 via the reverse control channel. The land originated call is established in steps L12–L23 in a conventional manner: Events L12–L23 depicted conform to conventional AMPS signalling guidelines so they are not discussed in further detail here.

At event L24, the MSC 130 is assumed to have previously received the mobile off-hook indication from the base station 120. The mobile handset 105 off-hook indication confirms that the mobile is indeed ready to receive the data call it has been alerted to. Therefore, at event L24, the MSC 130 prepares for synchronizing the cellular modem to the pool modem—land modem connection by toggling SW2 155 to position D. Synchronizing operations then commence between cellular modem 102 and PLMN 145 as described above in handling a mobile originated data call. Once synchronization is complete, the PLMN and pool modems are switched out to a direct audio connection between land modem 170 and cellular modem 102. At step L25, signalling related to the land originated data call completes and data can now be passed between land modem 170 and cellular modem 102.

Termination of a land-originated data call according to the preferred embodiment is handled in the same manner that a conventional land to mobile call is terminated.

Figure 5:
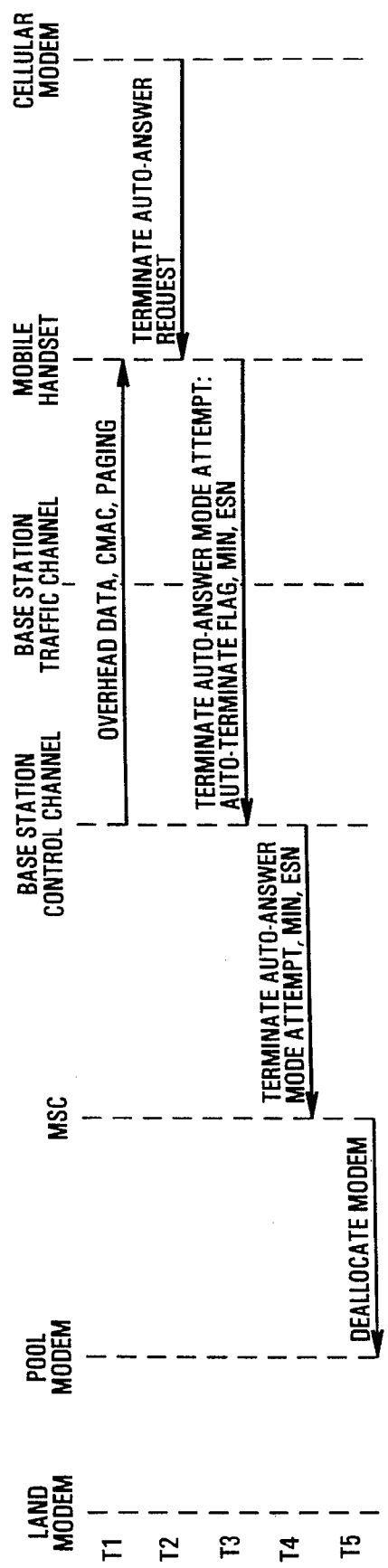
FIG. 5 is a signalling event chart of the data and signalling protocol needed to terminate auto answer mode registration according to the preferred embodiment.

FIG. 5 illustrates the signalling and data communications required to actively terminate auto-answer mode for an auto-answer registered mobile handset according to the preferred embodiment over the cellular network of FIG. 1.

Auto-answer termination begins at initial state T1. At state T1, the network is idle. At event T2, the cellular modem 102 informs the mobile handset 105 that it wishes to terminate auto-answer mode in a known manner sending a terminate auto-answer request over the cellular direct connection 103. The mobile handset 105 responds by broadcasting an FSK-encoded Terminate Auto-Answer Mode Attempt Broadcast over reverse control channel 111 to base station 120. Preferably, this broadcast will contain an auto-answer-terminate reserved bit along with the MIN/ESN of the handset originating the broadcast in a conventional 40-bit data signalling word well known in the art. The base station 120 decodes and verifies the Terminate Auto-Answer Mode Attempt Broadcast relays this information to the MSC 130. The MSC 130 proceeds to release all resources allocated to the specified mobile handset 105, including deallocation of the pool modem 140 and PLMN modem 145, in event T5. No reply back to the mobile handset or cellular modem is necessary, though one can be provided to confirm termination. This completes auto-answer mode termination signalling according to the preferred embodiment.

Figure 6A:
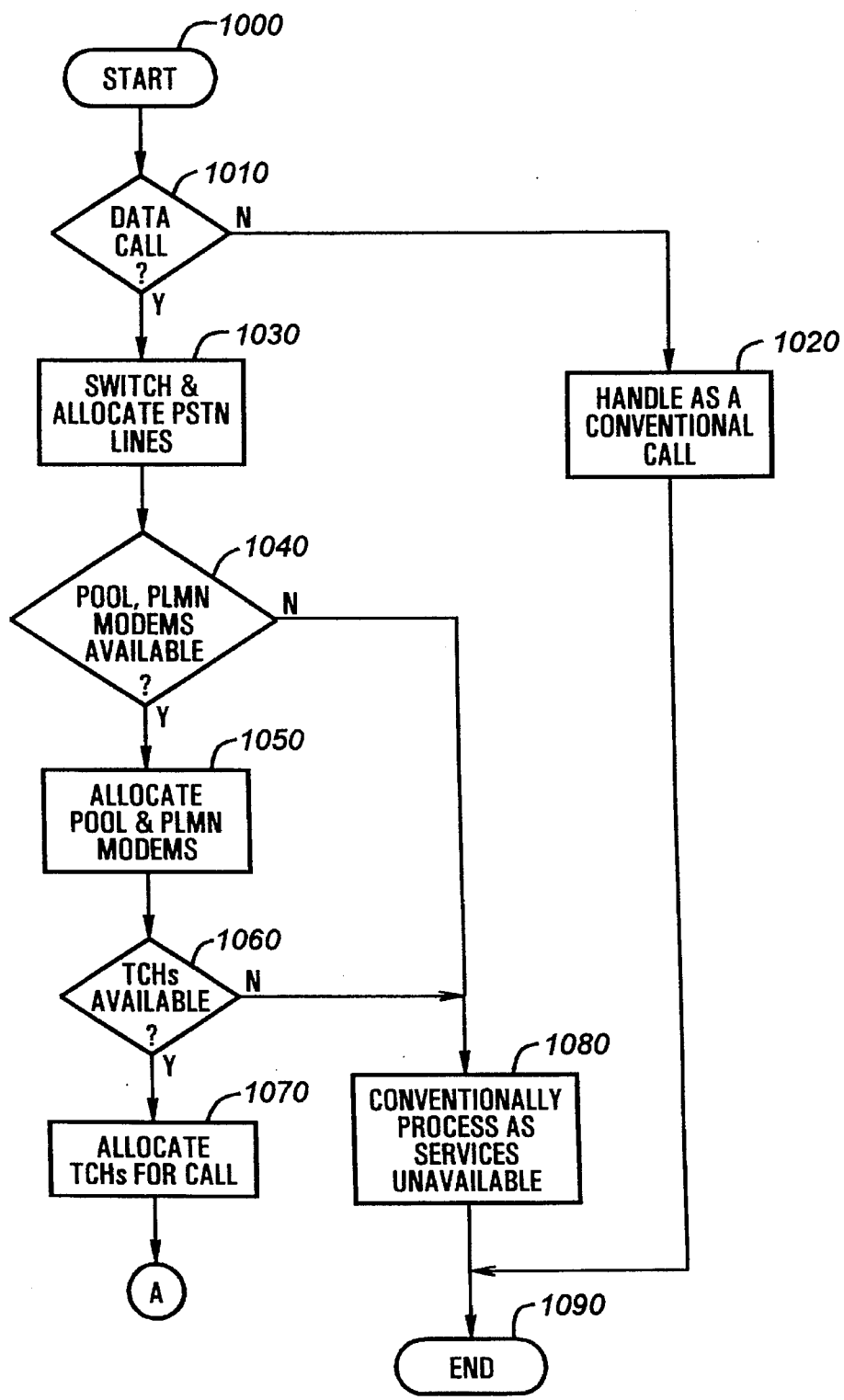
FIG. 6A–B is a flowchart of the process steps employed by the MSC of FIG. 1 in handling a mobile originated call according to the preferred embodiment.
Figure 6B:
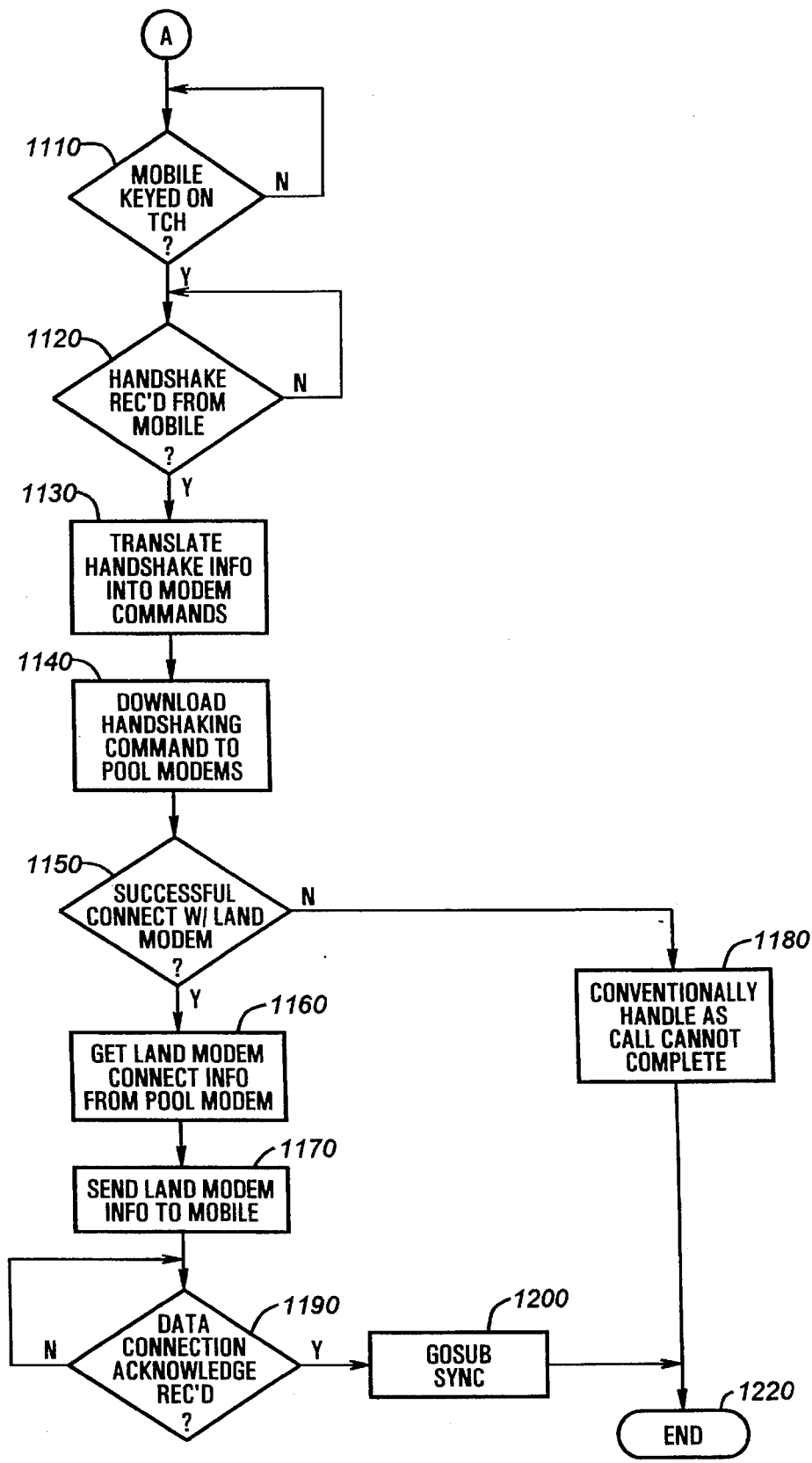

FIG. 6A–B is a flowchart of the process steps used by the MSC 130 to respond to a data call originated by cellular modem 102, according to the preferred embodiment. It should be noted here that the MSC 130 must be capable of handling several mobiles simultaneously and should retain highest priority to handle other mobiles requesting service during data call operations. Thus, according to the preferred embodiment, the MSC 130 can suspend execution of any step listed in FIGS. 6A–6B, as well as FIGS. 9, 12 and 15 upon proper notification by base station 120 or PSTN 160. Once servicing is complete, execution resumes where it was interrupted, and if necessary, data signalling is reissued.

When a mobile originate attempt is received by the cellular fixed-end, execution begins at step 1000. At step 1010, a determination is made whether the mobile originate attempt is for a voice call or a data call. According to the preferred embodiment, the MSC 130 will interrogate the status of the data_call_flag sent by the mobile handset 105 during the origination attempt. If the data call flag is clear, the mobile handset 105 is requesting a standard voice call, and control passes to step 1020. At step 1020, the MSC 130 handles the call as a conventional mobile originated voice call in a manner well known to one ordinarily skilled in the AMPS cellular networking art. Control thereafter passes to step 1090 to end processing of the conventional voice call.

If, however, in step 1010, it is determined that the mobile handset 105 is attempting to originate a data call according to the preferred embodiment, control instead passes to step 1030. At step 1030, the MSC 130 grabs the PSTN lines necessary to complete the call. Control then passes to step 1040, wherein a determination is made in a known manner whether a pool modem 140 and PLMN modem 145 are available to perform handshaking operations according to the preferred embodiment. If either is not available, control passes to step 1080. At step 1080, the call is conventionally processed by the MSC 103 as a services unavailable situation. Control thereafter passes to step 1090, which ends mobile origination data call processing by MSC 130.

If, however, in step 1040, both a pool modem and PLMN modem is available for establishing reliable handshaking between the land modem and the cellular modem, control instead passes to step 1050. At step 1050, the pool and PLMN modems are allocated for the current data call and control passes to step 1060. At step 1060, a determination is made in the conventional manner whether traffic channels are available for allocation to the mobile handset 105. If no traffic channels are available, control passes to step 1080, where the call is conventionally processed as a services unavailable situation by the MSC 130. Control then passes to step 1090, which ends processing of the call by the MSC 130.

If, however, in step 1060, the determination is made that traffic channels are available for allocation, control instead passes to step 1070. At step 1070, the traffic channels will be assigned to the base station 120 and the mobile handset 105 in a well-known manner. Control thereafter passes to step 1110. At step 1110, the MSC 130 waits for the mobile 105 to key up on the reverse traffic channel. Preferably, during this waiting period, the MSC 130 will be able to service other mobile handsets registered on the system. Once the fixed-end detects the SAT tones generated by mobile handset 105 on the allocated reverse traffic channel, control passes to step 1120. At step 1120, the MSC 130 waits for cellular modem handshaking information to be sent from mobile handset 105 through base station 120. Again, MSC 130 must be able to service other mobile handsets activated on the system during this step and any other processing involving the preferred embodiment. When the handshaking information is received, control passes to step 1130. At step 1130, the handshaking information is translated into applicable modem initialization commands so that the pool modem 140 can mimic the characteristics of the cellular modem 102 and establish an optimal connection with land modem 170. Preferably, the modem commands will be in the widely-known Hayes command set. Control then passes to step 1140, where the handshaking commands are downloaded from the MSC 130 to the allocated pool modem 140 across interface 131. Control then passes to step 1150. At step 1150, a determination is made whether a successful connection has been made with land modem 170 preferably through MSC 113 examination of the connection result codes generated by pool modem 140 after the connection attempt. If the connection is unsuccessful, control passes to step 1180, where the mobile originated call is conventionally handled as a cannot complete call PSTN error. Control thereafter transfers to step 1220, which signifies termination of processing by the MSC 130.

If, however, in step 1150, a determination is made that a successful connection has been established with land modem 170, control instead passes to step 1160. At step 1160, the land modem connection result codes are uploaded from the pool modem 140 to the MSC 130 via the interface 131 and translated. Control then passes to step 1170. At step 1170, the MSC 130 sends the land modem information to the mobile via the base station 120 using the FSK encoding methods already described. Control then passes to step 1190. At step 1190, the MSC 130 waits for the mobile handset 105 to regenerate the data connection tone previously described on the reverse traffic channel 112. Once the data connection acknowledgment has been received, control passes to step 1200. At step 1200, the sync subroutine (FIG. 8) is called to synchronize the cellular modem 102 to the land modem 170 according to the preferred embodiment. This routine will be discussed in detail in reference to FIG. 18 below. Thereafter, control passes to step 1220, which indicates completion of a mobile-originated data call task according to the preferred embodiment.

Figure 7A:
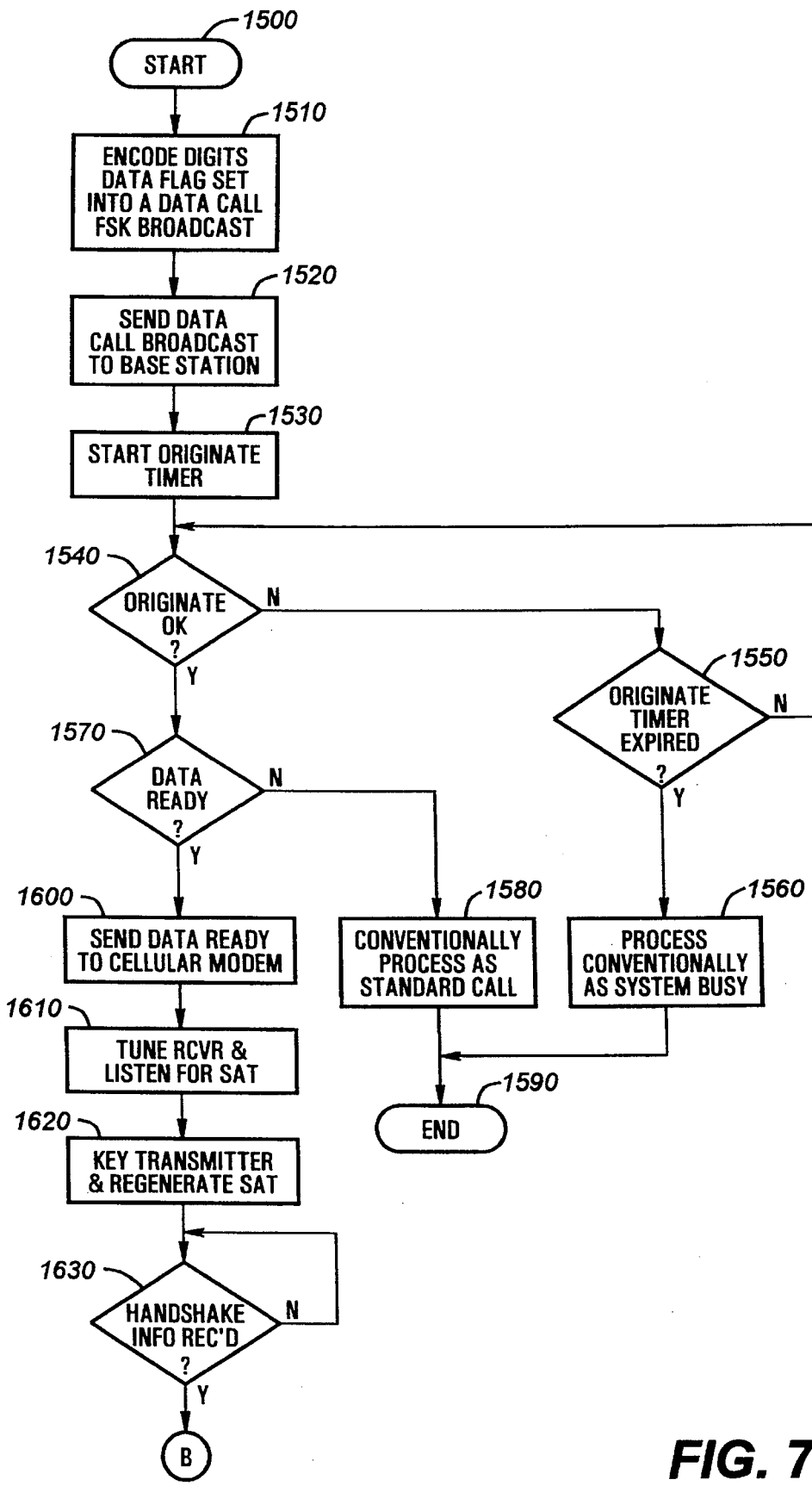
FIG. 7A–B is a flowchart of the process steps employed by the mobile handset of FIG. 1 in handling a mobile originated call according to the preferred embodiment.
Figure 7B:
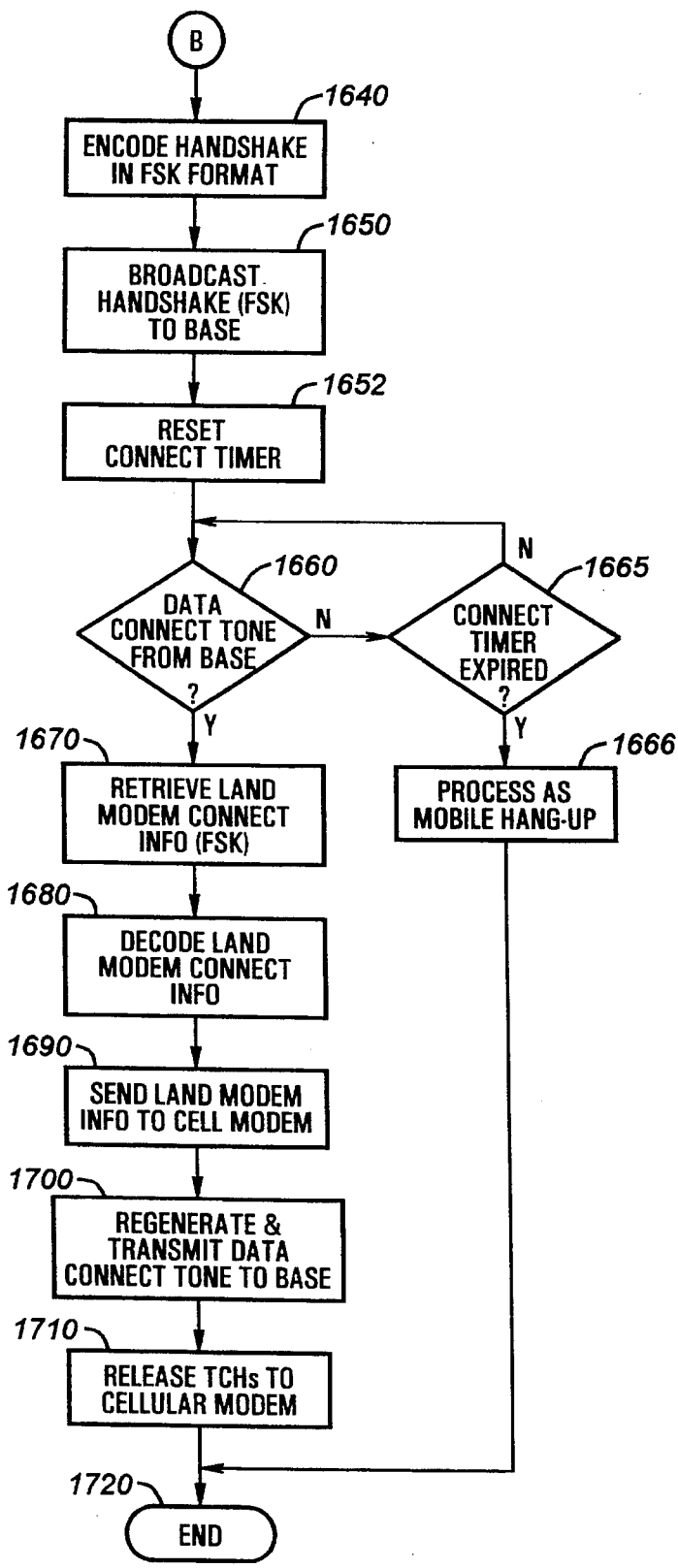

FIGS. 7A and 7B are flowcharts of the process steps taken by the mobile handset 105 microprocessor to respond to a data call originated by cellular modem 102 according to the preferred embodiment. When an originate order, including telephone number to be dialed, is sent from a cellular modem 102 to the mobile handset 105 as described in event M2 in FIG. 3 above, the mobile handset microcontroller begins execution at step 1500. Control then passes to step 1510. At step 1510, the telephone number corresponding to the land modem 170 at the cellular modem 102 wishes to dial, along with MIN/ESN is packed into a 40-bit data word and FSK encoded as described above. Also at step 1510, the mobile controller sets the data_call_flag to indicate that a data call is requested by the cellular modem 102. Control thereafter passes to step 1520. At step 1520, the mobile waits for the reverse control channel to clear in a well-known manner and sends the Originate Data Call Attempt Broadcast over the reverse control channel 111 to base station 120. Then, at step 1530, the conventional originate voice call timer is reset to handle a system busy or services unavailable situation within the system. Control thereafter passes to step 1540. At step 1540, the mobile handset polls the forward control channel to see if the cellular fixed-end has indicated an originate data call OK message over the forward control channel. If this message has not been received, control passes to step 1550, wherein a determination is made whether the conventional originate voice-call timer has expired. If not, control returns to step 1540 and the above sequence continues until an originate OK message is received on the forward control channel or the conventional originate timer expires. If, however, in step 1550, it is determined that the conventional originate timer has expired, control passes to step 1560. At step 1560, the mobile handset 105 defaults to process the call as conventional system busy situation known to those ordinarily skilled in the art. Thereafter, control passes to step 1590, which ends processing this data call processing within mobile handset 105.

If, however, in step 1540, an originate OK message is received before the originate call timer expires, control instead passes to step 1570. At step 1570, a determination is made as to the status of the data_ready_flag, which should preferably be contained in a reserved field of the Originate OK Message sent by the cellular fixed-end over the forward control channel 110. If the data_ready_flag is clear, this indicates the mobile handset 105 that the cellular fixed-end is not data call compatible according to the preferred embodiment. Thus, control transfers to step 1580 wherein the call is conventionally processed as a standard mobile originated voice call. Thereafter, control passes to step 1590, indicating completion of the mobile originated data call request within mobile handset 105.

If, however, in step 1570, it appears that the data_ready_ flag has been set, control instead passes to step 1600. At step 1600, the mobile handset 105 apprises the cellular modem 102 that the system is indeed data compatible and can reliably transport modem handshaking information. Control then passes to step 1610. At step 1610, mobile handset 105 conventionally tunes to the allocated receive and transmit traffic channels and listens for the supervisory audio tone, or SAT, generated by base station 120 in a well known manner. Control then passes to step 1620 in which the mobile handset 105 keys its transmitter and regenerates the SAT tone. At step 1630, the mobile handset waits for the handshaking information to be received from cellular modem 102. Once the handshaking information has been received over cellular direct connection 103, control transfers to step 1640. At step 1640, the handshaking information is placed in a 40-bit data word and encoded in FSK format as described above. Control then passes to step 1650, where the FSK encoded handshaking information is broadcast to the base station 120 preferably over reverse traffic channel 112. Control thereafter passes to step 1652. At step 1652, a resettable software timer known as a "connect timer" is used to serve as a watchdog timer to ensure that the mobile handset 105 does not endlessly wait for a data connect tone when no data connect tone is generated by a possibly busy or non-compatible cellular fixed-end. Control then passes to step 1660. At step 1660, the forward traffic channel is polled to see if a data connect tone from the base message has been received. If not, control passes to step 1665, in which the connect timer is polled to see if it has expired. If it has not, steps 1660 and 1665 are repeated in sequence until either a data connect tone is received from the base 120 or the connect timer expires. If the connect timer expires before data connect tone has been received from the base station 120, control passes to step 1666. At step 1666 the mobile handset 105 will conventionally process the data call as a mobile hang up situation. Control thereafter passes to step 1720, which indicates processing completion of the mobile originated data call within mobile handset 105 according to the preferred embodiment.

If, however, in step 1660, the data connect tone is received from the base 120 before the connect timer has expired, control instead passes to step 1670. At step 1670, land modem connection result codes encoded in FSK format are retrieved from the forward traffic channel 113. Then, at step 1680, the land modem information is decoded into standard digital form. Control then passes to step 1690, in which the land modem connection result codes are routed to the cellular modem 102 via the cellular direct connection 103. At step 1700, the mobile handset 105 regenerates and transmits the data connect tone signal to the base station over the reverse traffic channel 112. Thereafter, at step 1710, the forward and reverse traffic channels are released to the cellular modem 102, thereby completing an bidirectional audio link between cellular modem 102 and land modem 170. Control then passes to step 1720, which signifies successful completion of the cellular modem originated data call by mobile handset 105 in accordance with the preferred embodiment.

Figure 8:
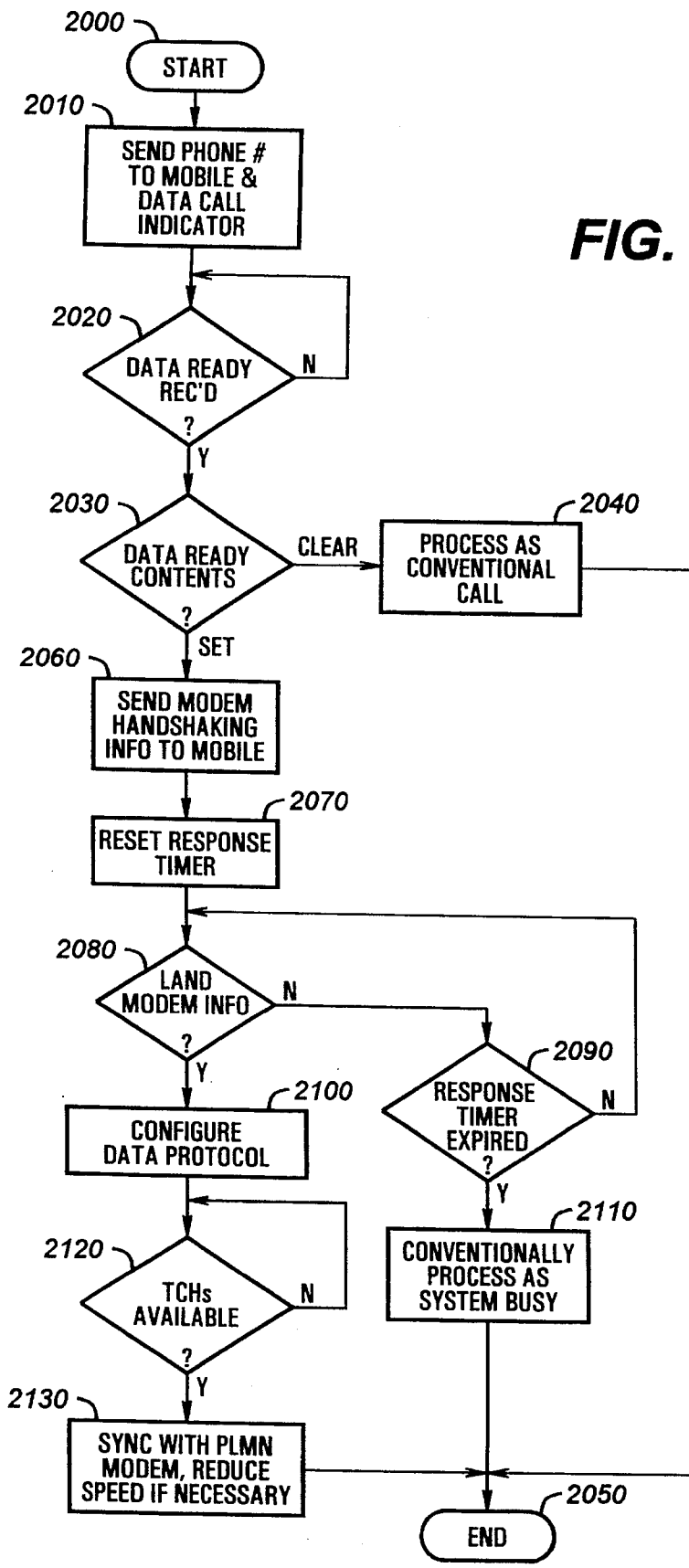
FIG. 8 is a flowchart of the process steps employed by the cellular modem of FIG. 1 in handling a mobile originated call according to the preferred embodiment.

FIG. 8 is a flowchart of the steps employed by the cellular modem 102 to initiate a data call according to the preferred embodiment. Upon receipt of initialization and dial commands from PC 101 through interface 106, the microcontroller of the cellular modem starts execution of the data call origination procedure at step 2000. Control passes to step 2010, wherein the digits to dial and a data call indicator flag are sent to the mobile handset 105 over cellular direct connection 103. Control then passes to step 2020. At step 2020, the cellular modem 102 waits for the data_ready_ flag message to be sent from the mobile handset 105. When it is received, control transfers to step 2030. At step 2030, the contents of the data_ready_flag are examined. If the contents of the data_ready_flag sent by the mobile handset 105 are clear, control passes to step 2040. At step 2040, cellular modem 102 processes the call as a conventional voice call without reliable handshaking functions, as the cellular fixed-end has signalled it does not support reliable handshaking, according to the preferred embodiment. Thereafter, control passes to step 2050, which ends handling of the call initiation sequence according to the preferred embodiment within cellular modem 102.

If, however, in step 2030, it is determined that the data ready flag has been set, indicating that the cellular fixed-end is indeed data capable according to the preferred embodiment, control instead passes to step 2060. At step 2060, modem handshaking information is assimilated in digital format and transferred to the mobile handset 105 over cellular direct connection 103. Control thereafter passes to step 2070. At step 2070, a resettable software "response timer" is initiated to ensure that the cellular modem does not endlessly wait for positive connection information from the mobile handset 105. Control thereafter passes to step 2080, in which a determination is made whether the land modem connection result codes have propagated back to the cellular modem 102. If not, control passes to step 2090. In step 2090, the response timer is polled to see if it has expired. If not, control transfers back to step 2080, and steps 2080 and 2090 are repeated until either the land modem connection result codes are received or the response timer has expired. If the response timer expires before the cellular modem 102 receives land modem connection information, control passes to step 2110. At step 2110, the cellular modem 102 conventionally processes the call as a system busy situation in a well-known manner. Control then passes to step 2050, which indicates completion of a data call initiation sequence according to the preferred embodiment within cellular modem 102.

If, however, in step 2080, the land modem connection result codes are received before the response timer expires, control instead passes to step 2100. At step 2100, the cellular modem 102 reconfigures itself if necessary to match the land modem connection result codes obtained from the cellular fixed-end. This allows for optimal coordination of connection speeds, error correction and data compression given the throughput limitations of both the land modem 170 and the cellular modem 102. Control thereafter passes to step 2120. At step 2120, the cellular modem waits in a conventional manner for the traffic channels to be released to it by the mobile handset 105. Once traffic channels are made available, control passes to step 2130. At step 2130, the cellular modem 102 sends synchronization signals (e.g., a carrier signal) to the fixed-end PLMN modem 145 at the other end of the voice channel and transmission speed reduced, if necessary. Thereafter, control passes to step 2050, indicating successful completion of the data call initiation process according to the preferred embodiment and conventional data communications can then be carried out.

Figure 9:
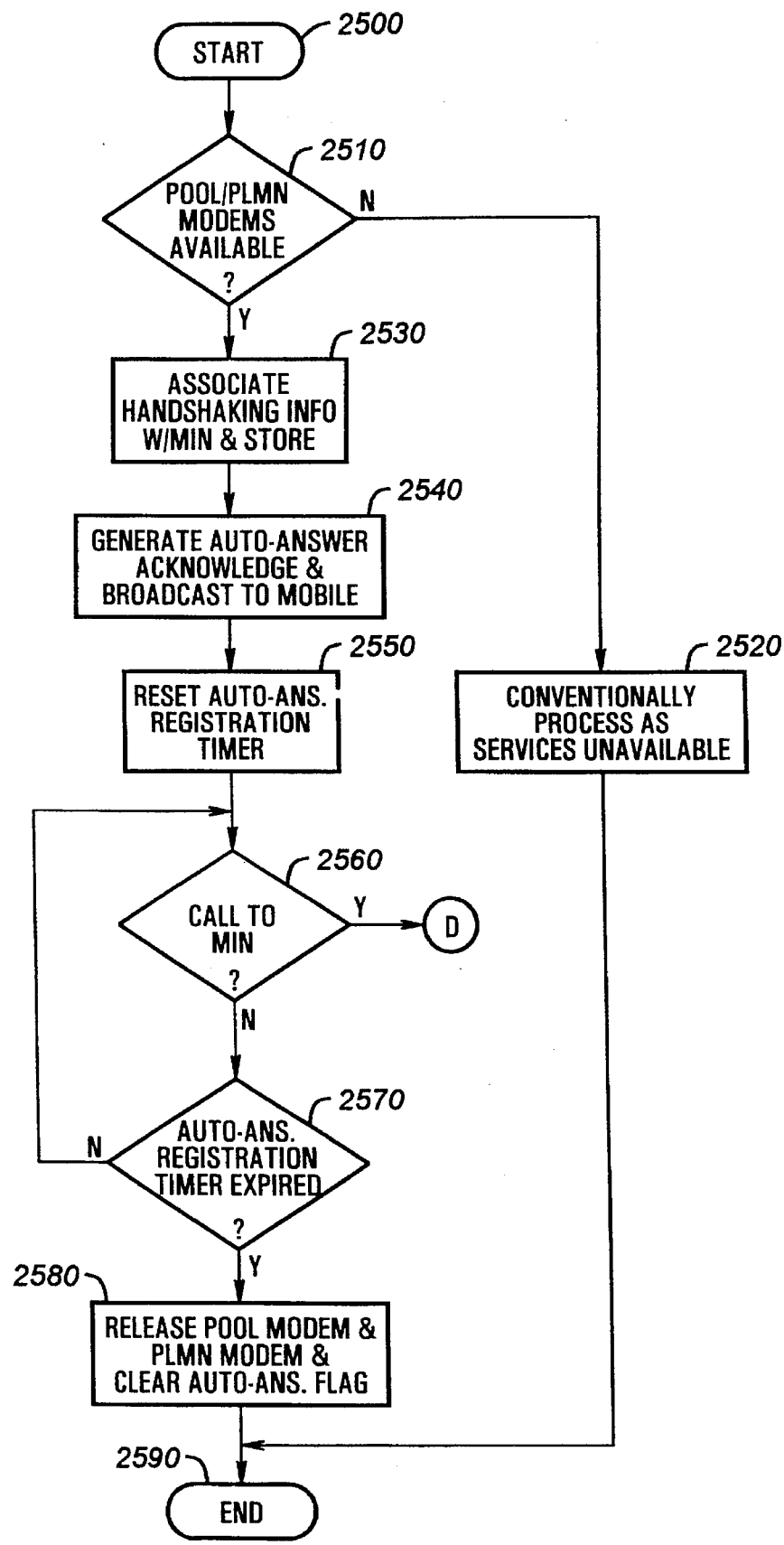
FIG. 9 is a flowchart of the process steps employed by the MSC of FIG. 1 in handling auto-answer mode registration according to the preferred embodiment.

FIG. 9 is a flowchart of the process steps taken by the MSC 130 to respond to an Auto-Answer Mode Registration Attempt Broadcast by mobile handset 105 according to the preferred embodiment. Upon receipt of the Auto-Answer Mode Registration Attempt Broadcast from the mobile handset 105, execution at MSC 130 begins at step 2500. At step 2510, a determination is made whether a pool modem 140 and PLMN modem 145 are available for reliable handshaking, synchronization and connection loss prevention according to the preferred embodiment. If, in step 2510, no modems are available, control passes to step 2520. At step 2520, the auto-answer registration attempt is conventionally processed as a services unavailable situation as is well-known in the art. Control thereafter transfers to step 2590, which signifies termination of the auto-answer mode registration process according to the preferred embodiment within the MSC 130.

If, however, in step 2510, a determination is made that both pool modem 140 and PLMN modem 145 are available to handle handshaking and connection loss prevention to establish an optimal data pathway with land modem 170, control instead passes to step 2530. At step 2530, handshaking information broadcast in the Auto-Answer Attempt Registration Broadcast is stored in MSC 130 memory and tagged with the mobile identification number corresponding to the broadcasting mobile handset 105. Control then passes to step 2540, wherein an auto-answer acknowledge data word including the mobile identification number data word is compiled, encoded, and sent to the mobile. Then at step 2550 an auto-answer mode registration timer is reset. The auto-answer registration timer is preferably a software based timer well known in the art with preferably a 5-minute terminal count. This ensures that the pool modem 140 and the PLMN modem 145 are not still reserved after the mobile station travels out of range or is turned off while keeping rf cycling requirements low at the mobile end.

Control then transfers to step 2560, wherein a determination is made whether an incoming call has been placed to the mobile handset 105 registered in auto-answer mode. If an incoming call has been placed at this time, control passes to step 4010 in FIG. 12. If however, in step 2560, it is determined that an incoming call has not yet been received, control instead passes to step 2570. At step 2570, a determination is made whether the auto-answer mode registration timer has expired. If the auto-answer mode registration timer has not expired, control passes back to step 2560, where once again determination is made whether an incoming call destined for auto-answer registered mobile handset 105 has come through PSTN 160. Steps 2560 and 2570 repeat sequentially until either an incoming call is received, or the auto-answer mode registration timer expires.

If, in step 2570, the auto-registration timer expires before an incoming call is received, control transfers to step 2580. At step 2580, the pool modem 140 and the PLMN modem 145 are deallocated and handshaking information associated with mobile handset 105 is cleared from memory. Thereafter, at step 2590, handling of the Auto-Answer Mode Registration Attempt Broadcast according to the preferred embodiment ends within the MSC 130.

Figure 10:
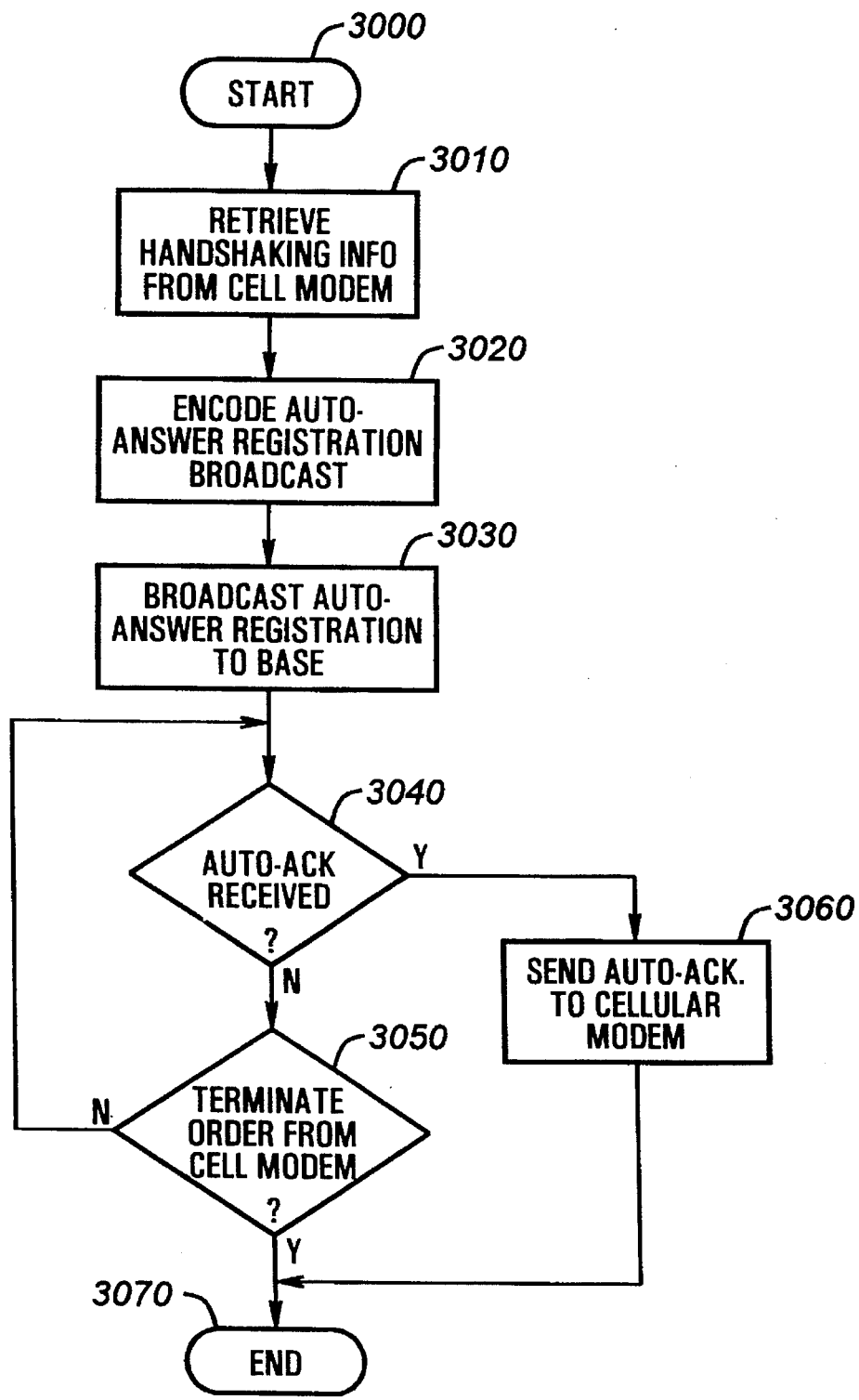
FIG. 10 is a flowchart of the process steps employed by the mobile handset of FIG. 1 in handling auto-answer mode registration according to the preferred embodiment.

FIG. 10 is a flowchart of the process steps used by the mobile handset 105 to respond to an auto-answer mode request sent by the cellular modem 102 according to the preferred embodiment. Upon receipt of the auto-answer request generated by cellular modem as shown in event R2 of FIG. 4, the mobile handset 105 begins execution at step 3000. At step 3010, handshaking information is retrieved from cellular modem 102 over cellular direct connection 103. In step 3020, the Auto-Answer Mode Registration Attempt Broadcast according to the preferred embodiment is assimilated in a standard length data signalling word and encoded in FSK format as described above. Control thereafter passes to step 3030. At step 3030, the Auto-Answer Mode Registration Attempt Broadcast is sent to the base station 120 over reverse control channel 112. Then, in step 3040, a determination is made whether the auto-answer mode registration has been successful. If no Auto_Answer_Mode_Registration_Acknowledge has been received from the cellular fixed-end, control passes to step 3050 wherein a determination is made whether a terminate order has been issued by the cellular modem 102. If no terminate order has been issued, control passes back to step 3040 and the process repeats until either the auto-answer acknowledge or the terminate order is received. As will be detailed in reference to FIG. 12, the cellular modem 102 will issue a terminate order to the mobile handset 105 in a known manner instructing the mobile handset to terminate auto-answer registration attempts upon expiration of an acknowledge timer. If, in step 3050, the terminate order has been received from cellular modem 102, control passes to step 3070 indicating unsuccessful registration with the cellular fixed-end.

If, however, in step 3040, the Auto-Answer Mode Registration Acknowledge has been received before a terminate order issues, control instead passes to step 3060 which passes on the acknowledge signal to the cellular modem via cellular direct connection 103. Thereafter, control passes to step 3070 signifying successful completion of auto-answer mode registration task within mobile handset 105.

Figure 11:
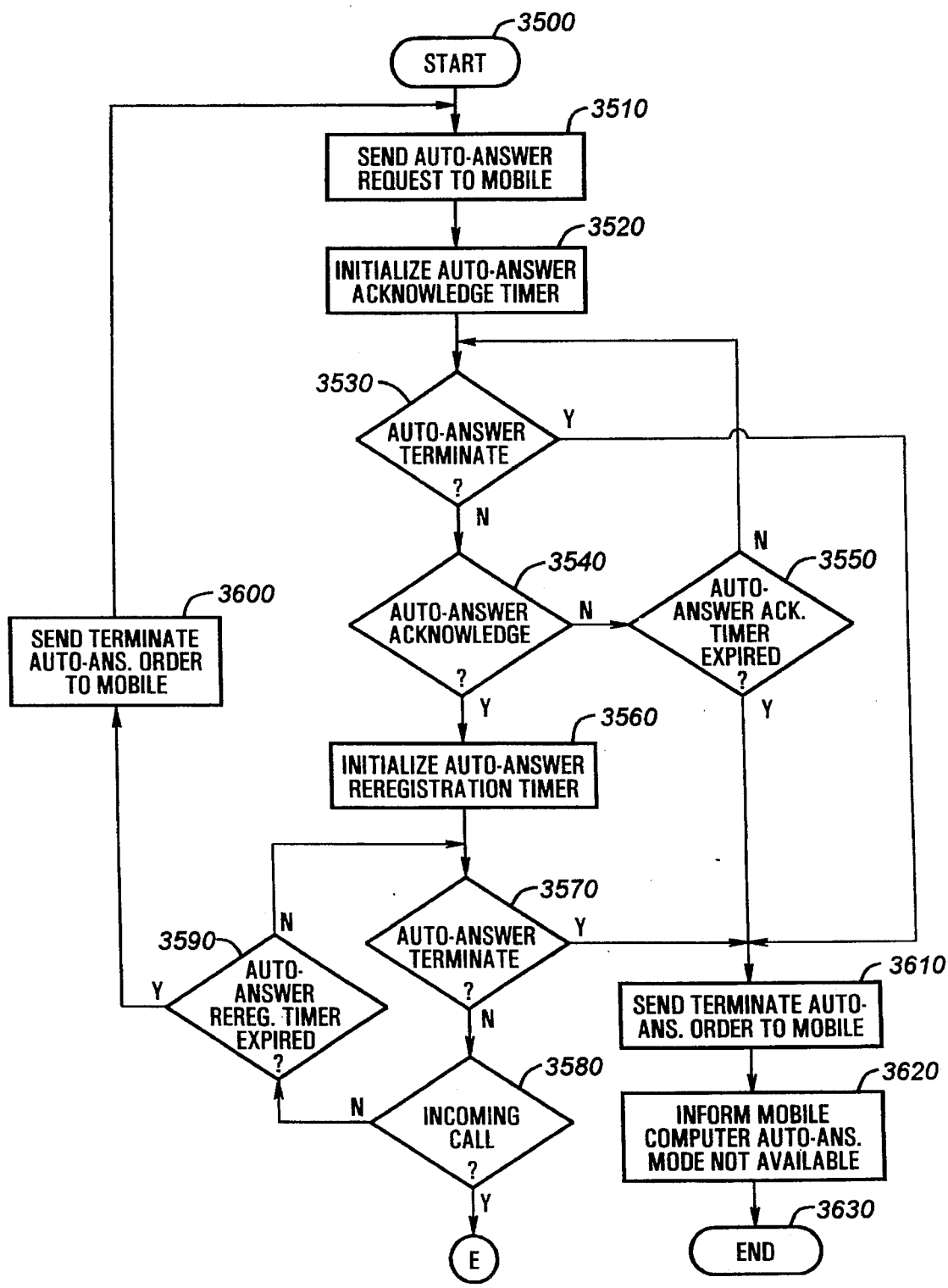
FIG. 11 is a flowchart of the process steps employed by the cellular modem of FIG. 1 in handling auto-answer mode registration according to the preferred embodiment.

FIG. 11 is a flowchart of the process steps taken by the cellular modem 102 microcontroller to initiate auto-answer mode registration according to the preferred embodiment. When an auto-answer command is downloaded to cellular modem 102 from PC 101 via interface 106, execution within cellular modem 102 begins at step 3500. At step 3510, an auto-answer request is sent to mobile handset 105 via the cellular direct connection. Control thereafter passes to step 3520. In step 3520, the auto-answer acknowledge timer, preferably a software timer, will be initialized. This watch dog timer insures that the cellular modem 102 does not think it is in auto-answer mode when necessary services such as a pool modem 140 are not available to handle a land originated call, or when the cellular fixed-end is not "data" compatible. The duration of the acknowledge timer will be based on system specific protocols and tolerances known by those skilled in the art. Control thereafter transfers to step 3530.

At step 3530, a determination is made whether the subscriber or the PC 101 wishes to terminate auto-answer mode. If so, control passes to step 3610 in which a terminate auto-answer mode order is sent to the mobile handset 105 over cellular direct connection 103. Control thereafter passes to step 3620, wherein the mobile computer 101 is informed that the auto-answer mode is not available. Control thereafter switches to step 3630 indicating termination of the auto-answer mode registration process within the cellular modem 102.

If, however, in step 3530, the subscriber or mobile computer 101 has not terminated the auto-answer mode, control passes to step 3540. At step 3540 a determination is made whether the Auto-Answer Mode Registration Acknowledge signal has been received by the mobile handset 105. If, in step 3540, Auto-Answer Mode Registration Acknowledge has not been received by mobile handset 105, control passes to step 3550, wherein the auto-answer acknowledge timer is polled to see if it has expired. If, in step 3550, the auto-answer acknowledge timer has not expired, control passes back to step 3530. Thus, steps 3530–3550 will be repeated in sequence until: (1) the subscriber or mobile computer 101 terminates auto-answer mode, or (2) no auto-answer acknowledge is received by mobile handset 105 before the expiration of the auto-answer acknowledge timer. If either situation (1) or situation (2) occurs, control passes to step 3610. In step 3610, as described above, the cellular modem 102 terminates auto-answer registration and informs the mobile computer 101 that auto-answer mode is not presently available.

If, however, an auto-answer acknowledgement is received before the expiration of the auto-answer acknowledge timer and no auto-answer terminate order has been issued, control instead passes to step 3560. At step 3560, an auto-answer reregistration timer, preferably another software-based timer, will be reset. The auto-answer reregistration timer will be used according to the preferred embodiment to periodically refresh the cellular fixed-end of its auto-answer status. Preferably, the registration timer is of slightly less duration than the auto-answer registration timer used by MSC 130 as described in FIG. 9. After the auto-answer reregistration timer has been reset, control passes to step 3570. At step 3570, a determination is again made whether the auto-answer mode has been terminated by subscriber interaction or through mobile computer 101. If so, control passes back to step 3610 and continues through step 3630 as outlined above to indicate that the cellular modem wishes to terminate auto-answer mode registration. If however, in step 3570, no auto-answer termination order is detected, control instead passes to step 3580.

At step 3580, cellular modem 102 queries the mobile handset 105 to see if an incoming call has been attempted by land modem 170. If there is no record of an incoming call, control passes to step 3590. At step 3590 a determination is made whether the auto-answer reregistration timer has expired. If the auto-answer reregistration timer has not expired at this point, control passes back to step 3570, and steps 3570–3590 are repeated until either: (1) the cellular modem detects an auto-answer terminate order; or (2) an incoming call has been detected before the expiration of the auto-answer reregistration timer. If no incoming call is received before the auto-answer reregistration timer expires, control passes from step 3590 to step 3600, wherein a terminate auto-answer mode order is sent to the handset 105 to terminate the current registration. However, control will then pass back to step 3510 to reregister auto-answer status with the cellular fixed-end. This methodology permits more efficient allocation of the limited pool modem resources for auto-answer mode operations contained in the cellular fixed-end and prevents allocation inefficiencies when the mobile station deactivates or travels out of range according to the preferred embodiment. If, however, in step 3580 an incoming call has been received before the auto-answer reregistration timer has expired and no auto-answer terminate order is pending, control passes to step 5010 in FIG. 14 below.

Figure 12:
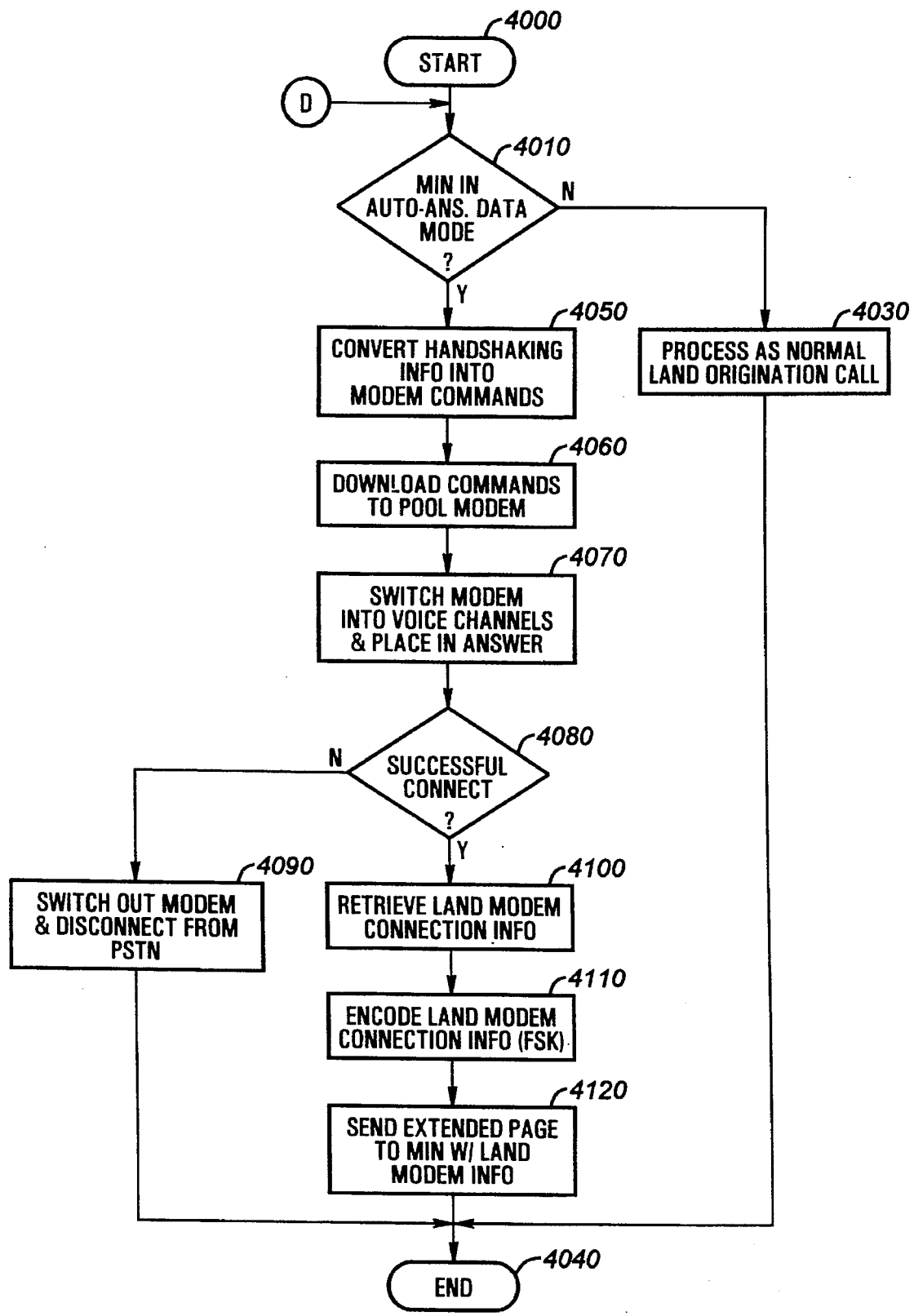
FIG. 12 is a flowchart of the process steps employed by the MSC of FIG. 1 in handling a land originated data call according to the preferred embodiment.

FIG. 12 is a flowchart of the process steps taken by the MSC 130 to respond to a land originated data call according to the preferred embodiment. When the MSC 130 receives a call originating from land modem 170 to a mobile handset 105 active on the cellular system described in FIG. 1 (event L2 in FIG. 4A), execution within the MSC 130 begins at step 4000. At step 4010, a determination is made whether the mobile identification number (MIN) corresponding to the destination telephone number is currently registered in auto-answer mode. If not, control passes to step 4030 and the incoming call is processed as a conventional land originated voice call. Control thereafter passes to step 4040, signifying termination of processing of a land-originated call according to the preferred embodiment within MSC 130.

If however, in step 4010, the destination mobile handset 105 is registered in auto-answer mode, control instead passes to step 4050. At step 4050, handshaking information associated with the destination mobile handset (previously submitted and stored during the auto-answer mode registration process) is converted into modem commands acceptable for use in pool modem 140. Control then passes to step 4060. At step 4060, the MSC 130 downloads the converted commands to the pool modem 140 across interface 131. At step 4070, after giving the pool modem 140 enough time to be initialized, control passes to step 4070, in which the pool modem 140 is switched into the PSTN circuit that wishes to establish contact with mobile handset 105. Concurrently, at step 4070, the modem is placed in answer mode. Thereafter, control passes to step 4080.

At step 4080, a determination is made whether the pool modem 140 is successfully connected with the land modem 170 using conventional techniques. If the connection is unsuccessful, control passes to step 4090, wherein the modem is switched out by MSC 130, deallocated, and the PSTN connection released in a well-known manner. Control thereafter passes to step 4040 indicating abortion of the land originated data call according to the preferred embodiment.

If, however, in step 4080, a determination is made that a successful connection between the pool modem 140 and the land modem 170 has been established, control instead passes to step 4100. At step 4100, the MSC 130 retrieves the land modem handshaking information uploaded to it by the pool modem 140. Concurrently, the MSC 130 instructs the pool modem to generate active pauses to the land modem 170 until a complete audio circuit can be formed between land modem 170 and cellular modem 102. Thereafter, in step 4110, the land modem connection handshaking information is packed into a 40-bit data signalling word which preferably follows the format used to broadcast cellular modem handshaking information during a mobile originated data call. Control thereafter passes to step 4120. At step 4120, the MSC instructs the base station 120 to send an extended page containing the mobile identification number and the land modem connection information to the mobile handset 105. Control thereafter passes to step 4040 indicating successful completion of the land originated data call according to the preferred embodiment. From this point on, the MSC 130 will continue to process the land originated data call as though it were a conventional voice call until it receives a mobile off-hook indication as described as event L23 in FIG. 5B above. Then, it will follow the process steps outlined in FIG. 18 below to synchronize the cellular modem 102 and redefine connection speed, if needed. This will establish a direct audio pathway between land modem 170 and cellular modem 102 across the network described in FIG. 1. Thereafter, standard modulated data communications between the modems may commence.

Figure 13:
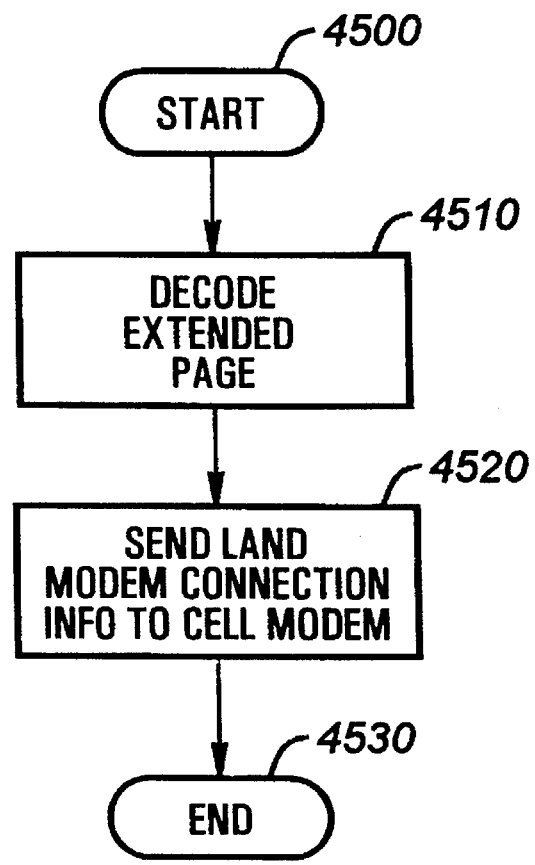
FIG. 13 is a flowchart of the process steps employed by the mobile handset of FIG. 1 in handling a land originated data call according to the preferred embodiment.

FIG. 13 is a flowchart of the process steps taken by the mobile handset 105 to respond to a data call originated by land modem 170 according to the preferred embodiment. Once an extended page containing land modem connection information is broadcast to the mobile handset 105 previously registered in auto-answer mode, execution begins at step 4500. At step 4510 the extended page is decoded and verified. In step 4520 the mobile handset 105 downloads the land modem handshaking information to cellular modem 102. Thereafter, control passes to step 4530 signifying the end of special processing steps required to handle a land originated data call according to the preferred embodiment with mobile handset 105. All subsequent events necessary to establish a conventional land originated voice call will be used to complete the audio connection between land modem 170 and cellular modem 102 with respect to mobile handset 105.

Figure 14:
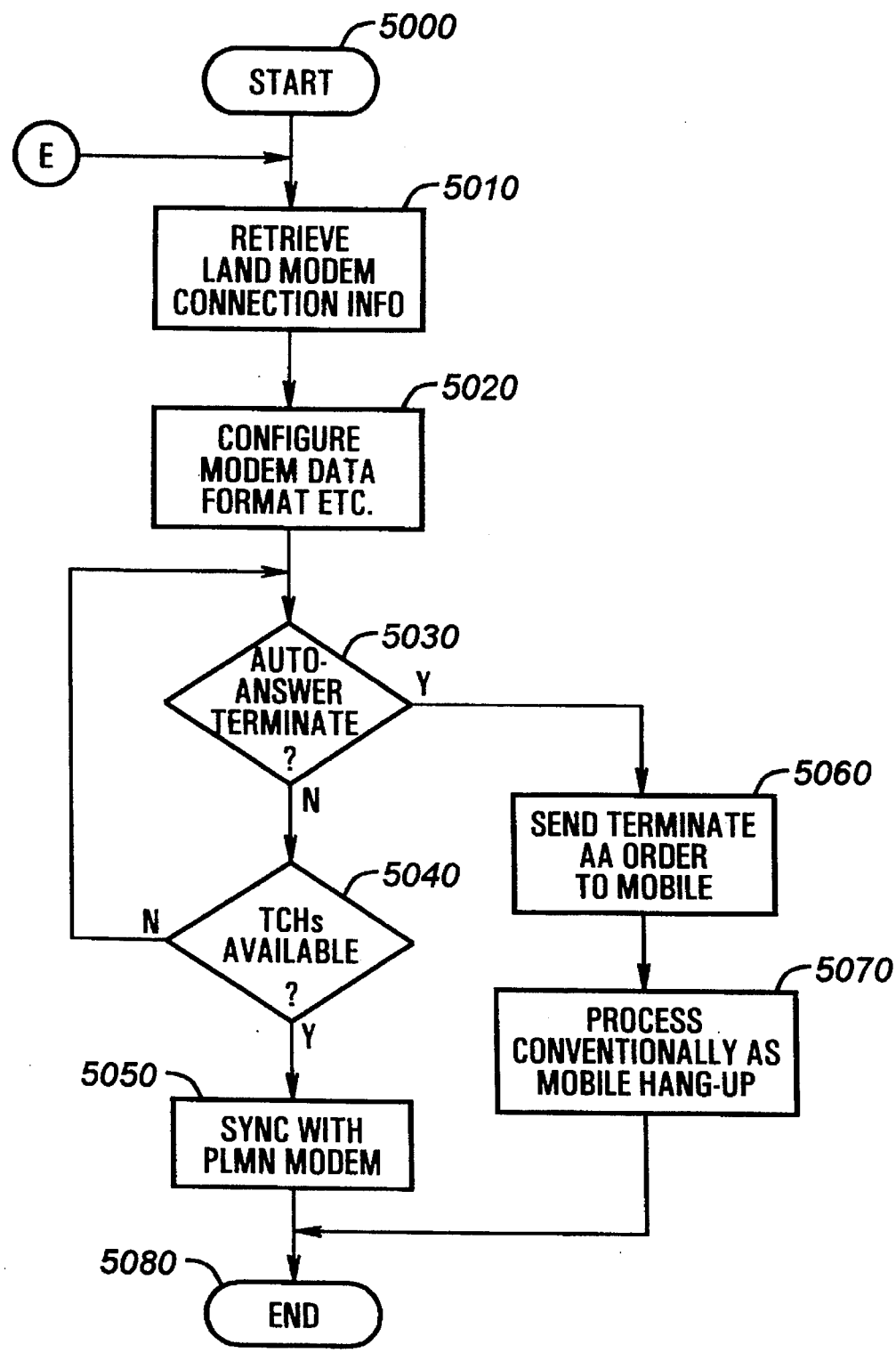
FIG. 14 is a flowchart of the process steps employed by the cellular modem of FIG. 1 in handling a land originated data call according to the preferred embodiment.

FIG. 14 is a flowchart depicting the steps taken by cellular modem 102 to respond to a data call originated by land modem 170 according to the preferred embodiment. Execution begins at step 5000, when land handshaking information is passed from the mobile handset 105 to cellular modem 102. In step 5010, the actual contents of the land handshaking information is retrieved and decoded in a known manner. In step 5020, the cellular modem 102 reconfigures itself based on the received land modem connection information in order to optimize data throughput given the limitations of the cellular modem and the land modem 170. Control thereafter passes to step 5030. At step 5030, a determination is made whether the subscriber or mobile personal computer 101 has issued an auto-answer terminate order to cellular modem 102. If an auto-answer terminate order has been received, control passes to step 5060. At step 5060, a terminate auto answer mode registration order is set to mobile handset 105. Control thereafter passes to step 5070. At step 5070, the land modem originated data call is processed conventionally as a mobile "on-hook" situation. Control thereafter passes to step 5080 signifying termination of processing of the land modem 170 originated data call according to the preferred embodiment within cellular modem 102.

If, however, in step 5030 no auto-answer termination order has been detected, control instead passes to step 5040. At step 5040, the cellular modem 102 queries in a conventional manner whether the reverse and forward traffic channels are available for direct data communications with land modem 170. If not, control passes back to step 5030. Steps 5030 and 5040 are reiterated in sequence until either an auto-answer terminate order has been received, or the traffic channels are released by mobile handset 105 to cellular modem 102.

If, in step 5040, the determination is made that the traffic channels have been released by mobile handset 105, the cellular modem 102 synchronizes with the cellular fixed-end as described above and then begins data transmission activities as directed by mobile PC 101 in a well-known manner. Thereafter, control passes to step 5080, signifying successful completion of a land modem originated data call according to the preferred embodiment.

Figure 15:
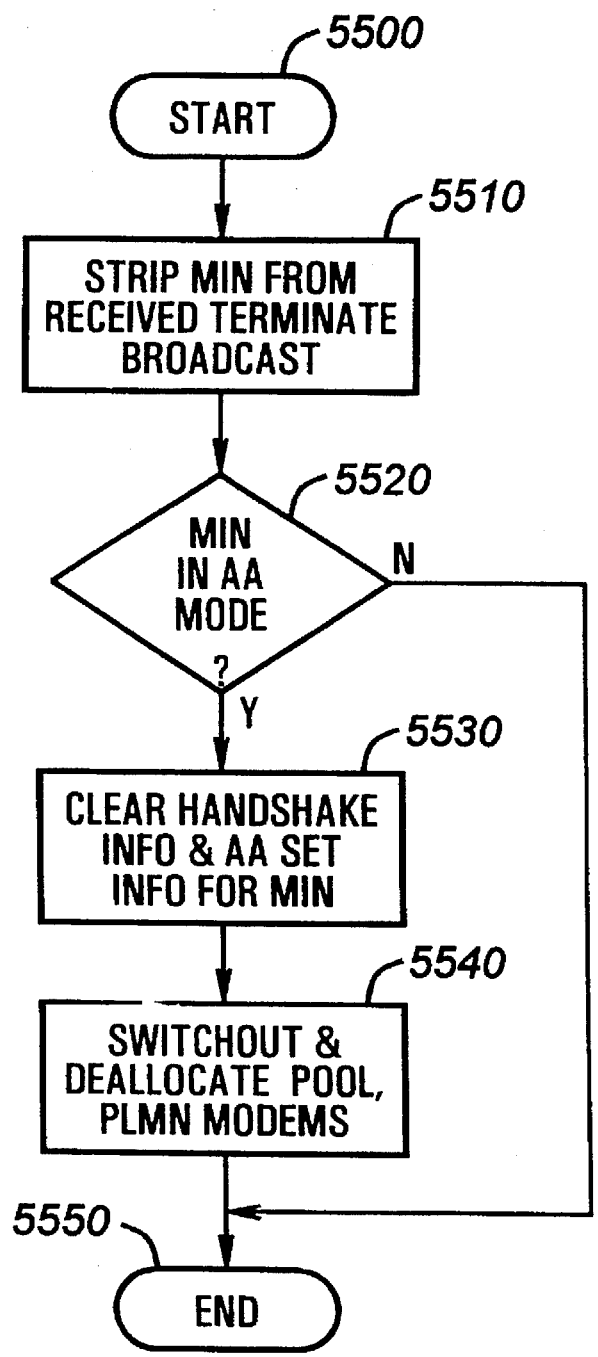
FIG. 15 is a flowchart of the process steps employed by the MSC of FIG. 1 in handling auto-answer mode termination according to the preferred embodiment.

FIG. 15 is a flowchart of the process steps employed by the MSC 130 when responding to a Terminate Auto-Answer Mode Attempt Broadcast sent by mobile handset 105. When a Terminate Auto-Answer Mode Attempt Broadcast (event R4 in FIG. 5 above), is received by base station 120 and passed to MSC 130, execution within the MSC 130 begins at step 5500. At step 5510, the mobile identification number of mobile handset 105 broadcasting the attempt is stripped from the request data. Thereafter, at step 5520, a determination is made whether the requesting mobile is currently registered in auto-answer mode according to the preferred embodiment. If the mobile corresponding to the broadcast mobile identification number is not currently in auto-answer mode, control passes to step 5550, indicating successful termination of the terminate auto-answer broadcast with MSC 130 according to the preferred embodiment. If, however, in step 5520, a determination is made that the mobile handset is currently registered in auto-answer mode, control instead passes to step 5530. At step 5530, the mobile identification number is cleared from the internal auto-answer mode registration table and in step 5540 the pool and PLMN modems previously allocated to the mobile are switched out and deallocated. It should be noted here the mobile handset will initiate a conventional on-hook sequence to terminate the call. Thereafter control passes to step 5550 signifying successful completion of the terminate auto-answer mode operation according to the preferred embodiment.

Figure 16:
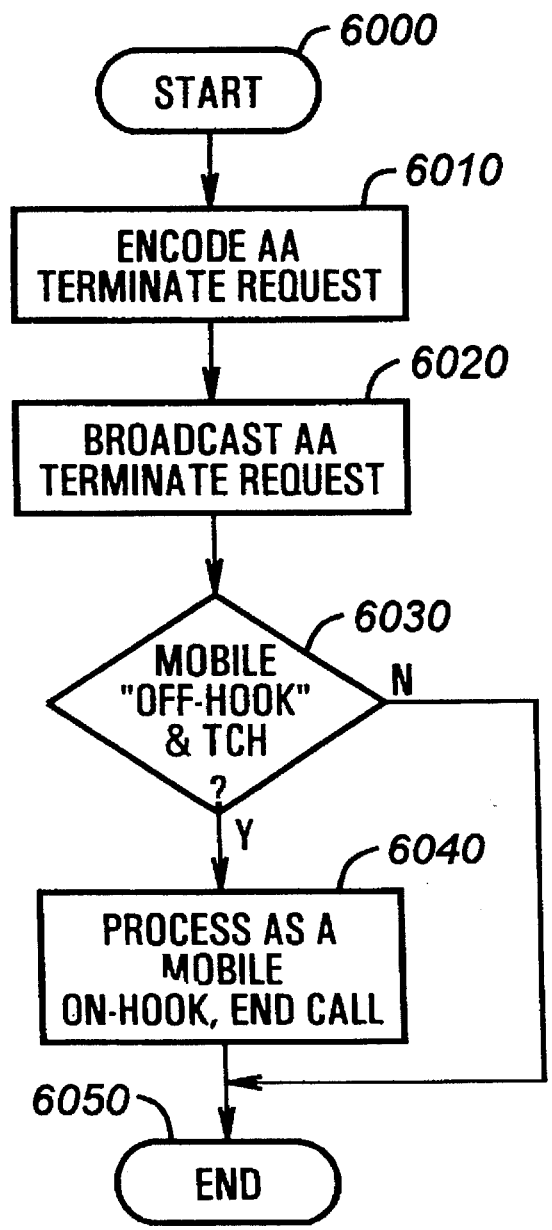
FIG. 16 is a flowchart of the process steps employed by the mobile handset of FIG. 1 in handling auto-answer mode termination according to the preferred embodiment.

FIG. 16 is a flowchart of the process used by the mobile handset 105 to respond to an auto-answer mode terminate request originated by cellular modem 102 according to the preferred embodiment. Once the terminate auto-answer request (indicated as event T2 in FIG. 5) is received by the mobile handset 105, execution starts at step 6000. At step 6010, the mobile handset formulates the Terminate Auto-Answer Mode Attempt Broadcast, preferably FSK-encoding a reserved bit packed along with the Mobile Identification Number and Electronic Serial Number in the 40-bit data signalling word used in AMPS cellular systems. Thereafter, at step 6020, the mobile handset 105 broadcasts the Terminate Auto-Answer Mode Attempt Broadcast to base station 120 along reverse control channel 111 or across reverse traffic channel 112 if a traffic channel has already been allocated to mobile handset 105. Control thereafter passes to step 6030.

In step 6030, a determination is made whether the mobile handset is in the off-hook state as is well known in the art with the traffic channels already allocated (signalling a call-in-progress situation). If the mobile is not yet off-hook, or the traffic channels have not been assigned, control passes to step 6050 indicating successful completion of the auto-answer mode terminate order by mobile handset 105. If, however, in step 6030, a determination is made that the land originated data call is currently in progress, control instead passes to step 6040. At step 6040, the mobile conventionally processes the data call as a hang-up or on-hook situation well known to those ordinarily skilled in the art. Thereafter, control passes to step 6050 indicating successful completion of the auto-answer mode termination order according to the preferred embodiment.

Figure 17:
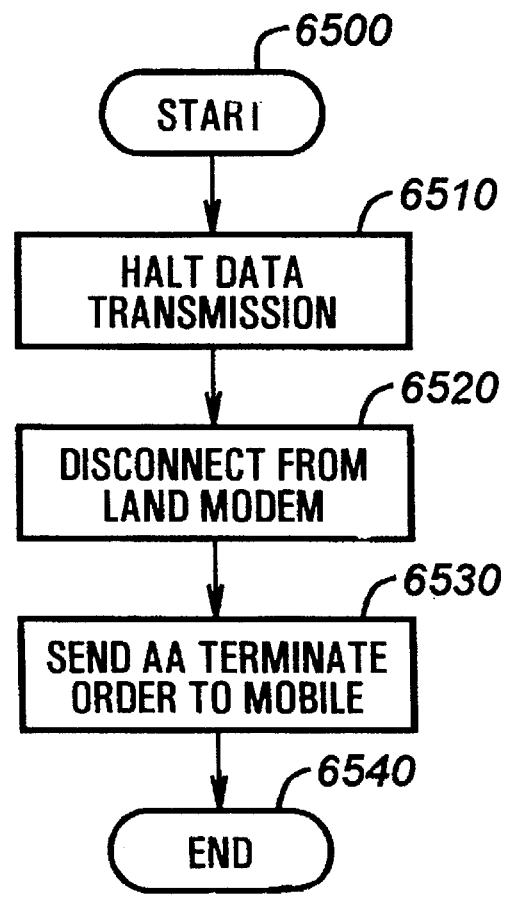
FIG. 17 is a flowchart of the process steps employed by the cellular modem of FIG. 1 in handling auto-answer mode termination according to the preferred embodiment.

FIG. 17 is a flowchart of the process steps employed by the cellular modem 102 to initiate a terminate auto-answer mode order according to the preferred embodiment. The cellular modem microcontroller begins execution at step 6500. At step 6510, if applicable, the cellular modem 102 halts all data transmission between it and the land modem 170. At step 6520, cellular modem 102 issues modem commands signalling it wishes to disconnect from land modem 170 in a known manner. In step 6530, it sends an auto-answer terminate order to mobile handset 105 over cellular direct connection 103. Thereafter control passes to step 6540 indicating successful completion of the auto-answer mode terminate order according to the preferred embodiment.

Figure 18:
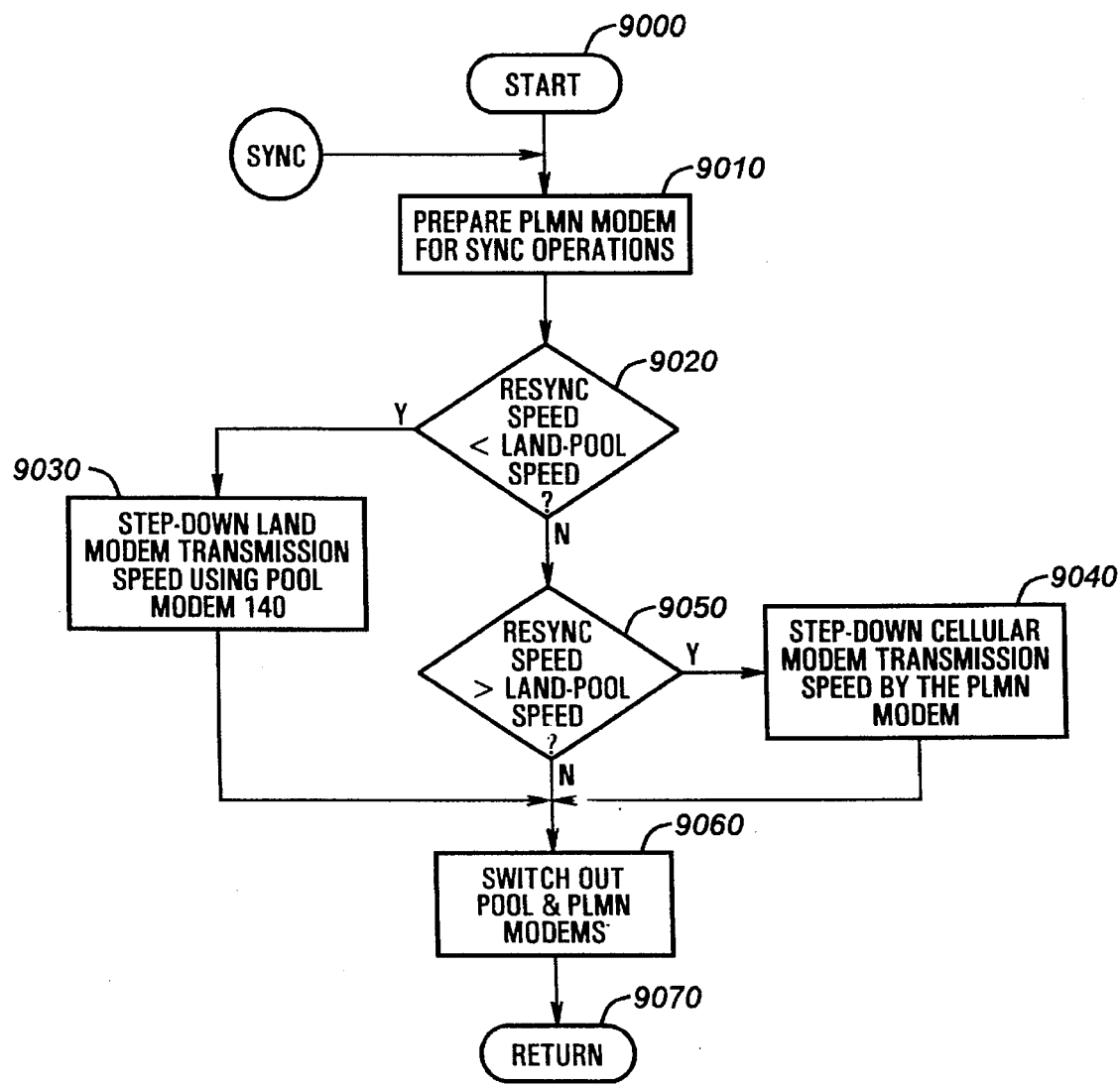
FIG. 18 is a flowchart of the process steps employed by the MSC of FIG. 1 in handling carrier synchronization operations between the cellular and land modems according to the preferred embodiment.

FIG. 18 is a flowchart of the process steps employed by the MSC 130 to synchronize the cellular modem 102 to the land modem 170 according to the preferred embodiment. Execution begins at step 9000. At step 9010, the PLMN modem 145 is activated to synchronize with the cellular modem 102 and is switched into the voice channel by toggling SW2 155 to position D. The PLMN modem 145 proceeds to synchronize the cellular modem 102 when the cellular modem issues a carrier signal. Control thereafter passes to step 9020. At step 9020 a determination is made whether the synchronization baud rate negotiated between cellular modem 102 and PLMN modem 145 is less than that previously established between the land modem 170 and pool modem 140. If so, control passes to step 9030. At step 9030, the land modem 170 is instructed to lower data transmission rates to match those set during cellular modem synchronization in step 9010 using commands issued by pool modem 140 still in connection with land modem 170. Thereafter control passes to step 9060.

If, however, in step 9020 the determination is made that the synchronization baud rate matches or exceeds the pool-land connection rate, control instead passes to step 9050. At step 9050, the determination is made whether the synchronization speed exceeds that previously negotiated between the land and pool modems. If so, control passes to step 9040, in which the cellular modem 102 is stepped down to match the lower speed previously negotiated by the pool modem through instructions sent by the PLMN modem 145. Thereafter control passes to step 9060.

If, however, in step 9050 the synchronization speed matches the negotiated speed, control bypasses step 9050 and instead passes directly to step 9060.

At step 9060, the pool modem 140 and PLMN modem 145 are switched out of the voice channel so a direct analog connection may be formed between cellular modem 102 and land modem 170. Specifically, SW1 150 is toggled to position A and SW3 156 is opened. Thereafter, control passes to step 9070 indicating successful completion of the synchronization operations according to the preferred embodiment.

From the above-described embodiment, it is clear that the technique of the present invention is directed to reliable passage of handshaking information between a cellular modem and a land modem to optimize modulated data transmissions between them. Instead of being modulated in bare form over the voice channel connection, handshaking information is instead FSK-encoded and broadcast using a network data signalling methodology preferably already used to reliably pass signalling information between the base and registered mobiles over the low power cellular control and traffic channels. Once received, the handshaking information is decoded and delivered to the destination modem in the appropriate format along cleaner transmission pathways. Reliable handshaking operations are contemplated whether the destination modem is a cellular modem registered in auto-answer mode (land-originated data call), or a land modem (mobile-originated data call). Backwards compatibility with non-compatible cellular fixed-ends or mobiles is maintained through extensive use of active acknowledgment messaging and software timed transactions.

This invention has been described in terms of particular embodiments. Obviously, modifications and alterations will be apparent to those skilled in the art in view of this disclosure, including, but not limited to, the particular cellular network, mobile handset (cellular transceiver) or cellular modem in which the present invention may be practiced, or the specific handshaking commands and negotiation protocols exchanged. It is therefore intended that all such equipments, variations, and modifications fall within the spirit and scope of the invention as claimed.

What is claimed is:

1. A method for reliably transmitting modem handshaking data through an analog cellular network, the method comprising the steps of:

a mobile station encoding a plurality of modem handshaking commands according to a first data signalling format already utilized to transport cellular signalling data and control information between said mobile station and a cellular fixed-end servicing said mobile station, said first data signalling format including error detection and correction overhead;

said mobile station broadcasting said modem handshaking commands encoded in said first data signalling format to said cellular fixed-end using a cellular radio link;

said cellular fixed-end decoding and verifying said received modem handshaking commands encoded in said first data signalling format;

said cellular fixed-end communicating via a land link with a remote land modem to exchange handshaking commands and reach an agreed on state;

said cellular fixed-end translating said agreed on state to connection result codes and encoding said connection result codes according to said first data signalling format; and said cellular fixed-end broadcasting said encoded connection result codes to said mobile station using said cellular radio link.

2. The method of claim 1, wherein said analog cellular network uses an advanced mobile phone system cellular signalling protocol.

3. The method of claim 1, wherein said analog cellular network uses a nordic mobile telephone system cellular signalling protocol.

4. The method of claim 1, wherein said mobile station encoding step and said cellular fixed-end encoding step include frequency shift keying of said modem handshaking commands and connection result codes respectively.

5. The method of claim 1, wherein said mobile station comprises a cellular modem tightly coupled to a mobile handset through a cellular direct connection.

6. The method of claim 5, wherein said mobile station encoding step comprises:

said cellular modem of said mobile station downloading said plurality of modem handshaking commands; and said mobile handset of said mobile station encoding said downloaded modem handshaking commands according to said first data signalling protocol.

7. The method of claim 5, further comprising:

said mobile handset of said mobile station receiving, decoding and verifying said encoded connection result codes broadcast by said cellular fixed-end;

said mobile handset of said mobile station uploading said decoded connection result codes to said cellular modem of said mobile station; and said cellular modem of said mobile station configuring to correspond to said decoded connection result codes uploaded by said mobile handset of said mobile station.

8. A method for reliably establishing modulated data communications between first and second modems passing through an analog cellular network, said first modem comprising a cellular modem tightly coupled to a cellular transceiver registered on said cellular network, said second modem comprising a remote land modem coupled to a fixed-end of said cellular network via an audio land line, the method comprising the steps of:

said cellular modem downloading a plurality of modem handshaking commands for establishing a data connection with said second modem to said cellular transceiver;

said cellular transceiver encoding said downloaded modem handshaking commands according to a first data signalling protocol used to transport cellular signalling data and control information through said cellular network;

said cellular transceiver broadcasting said modem handshaking commands encoded in said first data signalling protocol to said fixed-end of said cellular network via a cellular radio link;

said fixed-end of said cellular network receiving, decoding and verifying said modem handshaking commands encoded in said first data signalling protocol broadcast by said mobile handset;

said fixed-end of said cellular network converting said received, decoded and verified modem handshaking commands to a second data format suitable for transmitting said modem handshaking commands to a third modem switchably interposed between said fixed-end of said cellular network and said audio land line coupled to said second modem;

said fixed-end of said cellular network downloading said converted modem handshaking commands to said third modem;

said third modem establishing a data connection with said second modem by exchanging modem handshaking commands to reach a negotiated state;

said third modem uploading a connection result code to said fixed-end of said cellular network when said data connection is established, said connection result code reflecting said negotiated state;

said fixed-end of said cellular network encoding said uploaded connection result code according to said first data signalling protocol;

said fixed-end of said cellular network broadcasting said connection result code encoded in said first data signalling protocol to said cellular transceiver via said cellular radio link;

said cellular transceiver receiving, decoding and verifying said connection result code encoded in said first data signalling protocol broadcast by said fixed-end of said cellular network;

said cellular transceiver uploading said decoded connection result code to said cellular modem; and said cellular modem configuring to correspond to said connection result code uploaded by said cellular transceiver.

9. The method of claim 8, wherein said cellular network utilizes an advanced mobile phone system cellular signalling protocol.

10. The method of claim 8, wherein said cellular network utilizes a nordic mobile telephone system cellular signalling protocol.

11. The method of claim 8, wherein said encoding according to said first data signalling protocol steps include frequency shift keying operations.

* * * * *